(12) United States Patent
Moore et al.

(10) Patent No.: US 11,992,907 B2
(45) Date of Patent: May 28, 2024

(54) SYSTEM AND METHOD FOR DAMPING MACHINE-INDUCED VIBRATIONS IN A WORKPIECE

(71) Applicant: The Boeing Company, Chicago, IL (US)

(72) Inventors: Matthew B. Moore, Edmonds, WA (US); Patrick B. Stone, Monroe, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/048,880

(22) Filed: Oct. 24, 2022

(65) Prior Publication Data
US 2023/0135412 A1 May 4, 2023

Related U.S. Application Data

(60) Provisional application No. 63/275,048, filed on Nov. 3, 2021.

(51) Int. Cl.
*B23Q 11/00* (2006.01)
*B23Q 1/01* (2006.01)
*B23Q 1/03* (2006.01)

(52) U.S. Cl.
CPC .......... *B23Q 11/0039* (2013.01); *B23Q 1/015* (2013.01); *B23Q 1/035* (2013.01);
(Continued)

(58) Field of Classification Search
CPC ......... B64F 5/10; B25B 11/005; B23Q 1/035; B23Q 1/037; B23Q 3/062; B23Q 3/065;
(Continued)

(56) References Cited

U.S. PATENT DOCUMENTS 4,088,312 A * 5/1978 Frosch .................. B25B 11/005
269/21
4,382,728 A 5/1983 Anderson et al.
(Continued)

FOREIGN PATENT DOCUMENTS

DE 3810711 A * 12/1988 ............. B23Q 1/035
ES 2354793 A1 * 3/2011 ............. B23Q 1/032
(Continued)

OTHER PUBLICATIONS

Netherlands Patent Office, Netherlands Search Report and Written Opinion, App. No. NL2029836 (dated Aug. 23, 2022).
(Continued)

*Primary Examiner* — Sunil K Singh
*Assistant Examiner* — Michael Vitale
(74) *Attorney, Agent, or Firm* — Walters & Wasylyna LLC

(57) ABSTRACT

A system for damping machine-induced vibration in a workpiece includes a plurality of workpiece holders to hold the workpiece in a work cell. The system also includes a machine tool located in the work cell. The machine tool performs a machining operation on the workpiece while the workpiece is held by the plurality of workpiece holders. The system further includes a damping apparatus coupled to the workpiece. The damping apparatus controls machine-induced vibrations in the workpiece during the machining operation.

20 Claims, 14 Drawing Sheets

(52) U.S. Cl.
CPC ....... *B23B 2250/16* (2013.01); *B23C 2250/00* (2013.01); *B23Q 2703/04* (2013.01); *Y10T 409/304312* (2015.01)

(58) Field of Classification Search
CPC .... B23Q 3/082; B23Q 3/088; B23Q 11/0039; Y10T 409/304312; Y10T 408/76; Y10T 82/2595; Y10S 82/904; B24B 41/007; B23D 47/00; B23C 2250/00; B23B 2250/16
USPC ........ 82/163, 904; 269/266, 289 R; 408/143; 409/141; 700/280
See application file for complete search history.

(56) References Cited

U.S. PATENT DOCUMENTS

| | | | |
|---|---|---|---|
| 4,486,128 A | | 12/1984 | Baker et al. |
| 4,995,146 A | * | 2/1991 | Woods .................... B64C 3/185 |
| | | | 269/910 |
| 5,088,609 A | | 2/1992 | Fryc |
| 5,163,793 A | * | 11/1992 | Martinez ................ B23Q 1/037 |
| | | | 409/219 |
| 5,364,083 A | * | 11/1994 | Ross .................... B25B 11/005 |
| | | | 269/21 |
| 5,457,868 A | * | 10/1995 | Blaimschein .......... B23Q 1/035 |
| | | | 269/21 |
| 5,653,005 A | * | 8/1997 | Speller, Sr. ............ B25J 15/103 |
| | | | 29/703 |
| 5,817,269 A | | 10/1998 | Younie et al. |
| 6,024,392 A | * | 2/2000 | Blatt .................... B25B 11/007 |
| | | | 294/185 |
| 6,029,352 A | * | 2/2000 | Nelson .................... B64F 5/10 |
| | | | 29/722 |
| 6,170,157 B1 | * | 1/2001 | Munk .................... B64F 5/10 |
| | | | 29/407.01 |
| 6,418,602 B2 | * | 7/2002 | Crocker ................... B21J 15/10 |
| | | | 29/714 |
| 6,430,796 B1 | | 8/2002 | Jones et al. |
| 7,137,202 B2 | * | 11/2006 | Miller ...................... B64F 5/10 |
| | | | 29/799 |
| 7,168,898 B2 | * | 1/2007 | Hamann ............. G05B 19/401 |
| | | | 409/199 |
| 7,273,333 B2 | | 9/2007 | Buttrick et al. |
| 7,334,673 B2 | | 2/2008 | Boberg et al. |
| 7,574,933 B2 | | 8/2009 | Hazlehurst et al. |
| 8,005,563 B2 | | 8/2011 | Cobb et al. |
| 8,606,388 B2 | | 12/2013 | Cobb et al. |
| 8,620,470 B2 | | 12/2013 | Cobb et al. |
| 8,733,707 B2 | | 5/2014 | Stone |
| 9,651,935 B2 | | 5/2017 | Stone |
| 9,981,367 B2 | | 5/2018 | Nestleroad et al. |
| 10,442,153 B2 | | 10/2019 | Shinozaki et al. |
| 10,520,933 B2 | | 12/2019 | Stone et al. |
| 10,710,327 B2 | | 7/2020 | Butler |
| 10,711,815 B2 | | 7/2020 | Chan et al. |
| 10,723,485 B2 | | 7/2020 | Moore et al. |
| 10,906,158 B2 | | 2/2021 | Newton |
| 10,919,746 B2 | | 2/2021 | Harada |
| 11,007,766 B2 | | 5/2021 | Bye |
| 2008/0084018 A1 | | 4/2008 | Baumann et al. |
| 2019/0084193 A1 | | 3/2019 | Riedel |
| 2021/0187676 A1 | | 6/2021 | Schroeder et al. |

FOREIGN PATENT DOCUMENTS

| | | |
|---|---|---|
| FR | 2 861 326 | 4/2005 |
| WO | WO 99/46079 | 9/1999 |
| WO | WO 2012/132773 | 10/2012 |

OTHER PUBLICATIONS

European Patent Office, Extended European Search Report, App. No. 22200545.6 (dated Feb. 2, 2023).

* cited by examiner

SYSTEM AND METHOD FOR DAMPING MACHINE-INDUCED VIBRATIONS IN A WORKPIECE

PRIORITY

This application claims priority from U.S. Ser. No. 63/275,048 filed on Nov. 3, 2021.

FIELD

The present disclosure relates generally to workpiece processing and, more particularly, to systems and methods for damping machine-induced vibrations in a workpiece induced during a machining operation.

BACKGROUND

Composite parts are commonly used in applications where light weight and high strength are desired, such as in aircraft and vehicles. Typically, one or more machining or other processing operations are performed on the composite part, such as drilling holes, machining features, and trimming edges. However, composite parts may tend to vibrate during the machining operation. Such vibrations may present challenges related to the accuracy of the machining operation. As such, post-machining operations, such as shimming or rework, may be required. These challenges may also limit the capacity for determinant assembly or predictive assembly of a manufactured structure that includes the composite part. Accordingly, those skilled in the art continue with research and development efforts in the field of composite manufacturing.

SUMMARY

Disclosed are examples of a system for damping vibrations in a workpiece, a damping apparatus for controlling machine-induced vibrations in a workpiece, a method for damping vibrations in a workpiece, a method for selectively increasing a mass of a workpiece, a method for modifying a natural frequency of a workpiece, and a workpiece manufactured using the system or the damping apparatus and according to the methods. The following is a non-exhaustive list of examples, which may or may not be claimed, of the subject matter according to the present disclosure.

In a first example, the disclosed system includes a plurality of workpiece holders to hold a workpiece in a work cell. The system also includes a machine tool located in the work cell. The machine tool performs a machining operation on the workpiece while the workpiece is held by the plurality of workpiece holders. The system further includes a damping apparatus coupled to the workpiece. The damping apparatus controls machine-induced vibrations in the workpiece during the machining operation.

In a second example, the disclosed method is performed using the system of the first example.

In a third example, the disclosed workpiece is manufactured using the system of the first example.

In a fourth example, the disclosed method if for fabricating a portion of an aircraft using the system of the first example.

In a fifth example, the disclosed damping apparatus includes a fixture base and a plurality of grippers coupled to the fixture base. Each one of the plurality of grippers is selectively extendable and retractable relative to the fixture base to be selectively connected to the workpiece.

In a sixth example, the disclosed system includes the damping apparatus of the fifth example.

In a seventh example, the disclosed method is performed using the damping apparatus of the fifth example.

In an eighth example, the disclosed method is for fabricating a portion of an aircraft using the damping apparatus of the fifth example.

In a ninth example, the disclosed workpiece is manufactured using the damping apparatus of the first example.

In a tenth example, the disclosed method includes steps of: (1) holding a workpiece; (2) selectively controlling a natural frequency of the workpiece; and (3) performing a machining operation on the workpiece.

In an eleventh example, the disclosed system is implemented according to the method of the tenth example.

In a thirteenth example, the disclosed workpiece is manufactured according to the method of the tenth example.

In a fourteenth example, a portion of an aircraft is assembled according to the method of the tenth example.

In a fifteenth example, the disclosed method includes steps of: (1) selecting one or more locations on a workpiece; and (2) coupling a damping apparatus the workpiece at the one or more locations; and (3) increasing a mass of a portion of the workpiece, including the one or more locations, by a mass of the damping apparatus.

In a sixteenth example, the disclosed method includes steps of: (1) determining a natural frequency of a workpiece; and (2) modifying a natural frequency of at least a portion of the workpiece by increasing a mass or a stiffness of at least a portion of the workpiece when an oscillating force is applied to the workpiece by a machine tool during a machining operation.

Other examples of the disclosed system, damping apparatus, method, and workpiece will become apparent from the following detailed description, the accompanying drawings, and the appended claims.

DETAILED DESCRIPTION

Referring generally to FIGS. 1-12, by way of examples, the present disclosure is directed to a system 100 for damping vibrations in a workpiece 102. The system 100 facilitates one or more processing operation, such as at least one machining operation, being performed on the workpiece 102. Additionally, the system 100 facilitates automated indexing of the workpiece 102 within a work cell and conformance of the workpiece 102 to a predetermined or desired shape within the work cell during a processing operation. As such, the system 100 advantageously improves the accuracy and precision of the machining operation and facilitates determinant assembly or predictive assembly of a structure that includes the workpiece 102.

In one or more examples, the workpiece 102 is made of a composite material, such as a fiber reinforced polymer (e.g., a composite workpiece). In one or more examples, the workpiece 102 is made of a metallic material (e.g., a metallic workpiece). In still other examples, the workpiece 102 is made of any other suitable material or combination of materials.

For the purpose of the present disclosure, the term "composite workpiece" (e.g., the workpiece 102) refers to any object, article, item, or structure made of a cured composite material. For the purpose of the present disclosure, the term "post-cure" refers to a condition of a composite material after a curing operation, such as by application of heat and/or pressure, to cure, anneal, dry, and/or harden the composite material.

Figure 15:
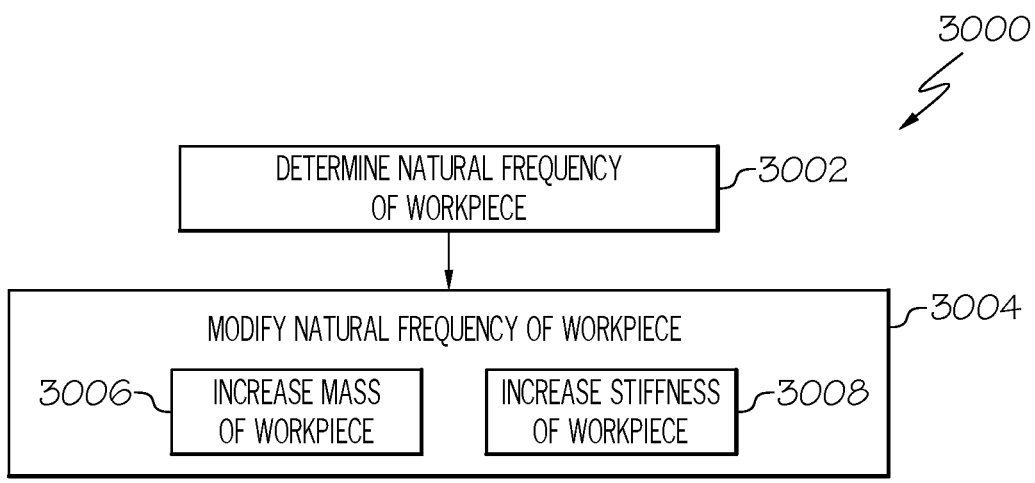
FIG. 15 is a flow diagram of an example of a method for modifying a natural frequency of a workpiece.

In one or more examples, the workpiece 102 is, or forms, a part of or a component of a larger manufactured article or structure, such as an aircraft (e.g., aircraft 1200 shown in FIG. 15) or a component of an aircraft. As an example, the workpiece 102 is a wing panel 1230 (e.g., as shown in FIG. 15) of the aircraft 1200.

It can be appreciated that a machining operation (e.g., drilling, boring, milling, cutting, routing, trimming, etc.) performed on a workpiece (e.g., a composite workpiece or a metallic workpiece) may tend to induce vibrations in the workpiece. Such vibrations may move the workpiece away from a desired, or indexed, position and/or may temporarily change the shape of the workpiece away from a desired shape during machining. Such movement and/or deformation may lead to inaccuracies in the machining operation. The undesirable effect of such vibrations may increase for relatively long and thin workpieces, such as panels, stiffeners, and the like.

It is therefore desirable to hold a workpiece in a fixed position during a machining operation to prevent vibration, or "chatter," which can produce surface flaws in the workpiece. It is also desirable to prevent deflection of the workpiece under a machining load, which can reduce machining accuracy. Additionally, it is desirable to perform several machining operations in the same location, for example, in a manufacturing work cell, using the same machine tool for different workpieces.

The principles and implementations of the system 100 disclosed herein enable the workpiece 102 to be maintained at a desired position and/or maintained in a desired shape during a machining operation while damping machine-induced vibrations. As such, machining inaccuracies or inconsistencies due to vibrations may be reduced or eliminated.

Figure 1:
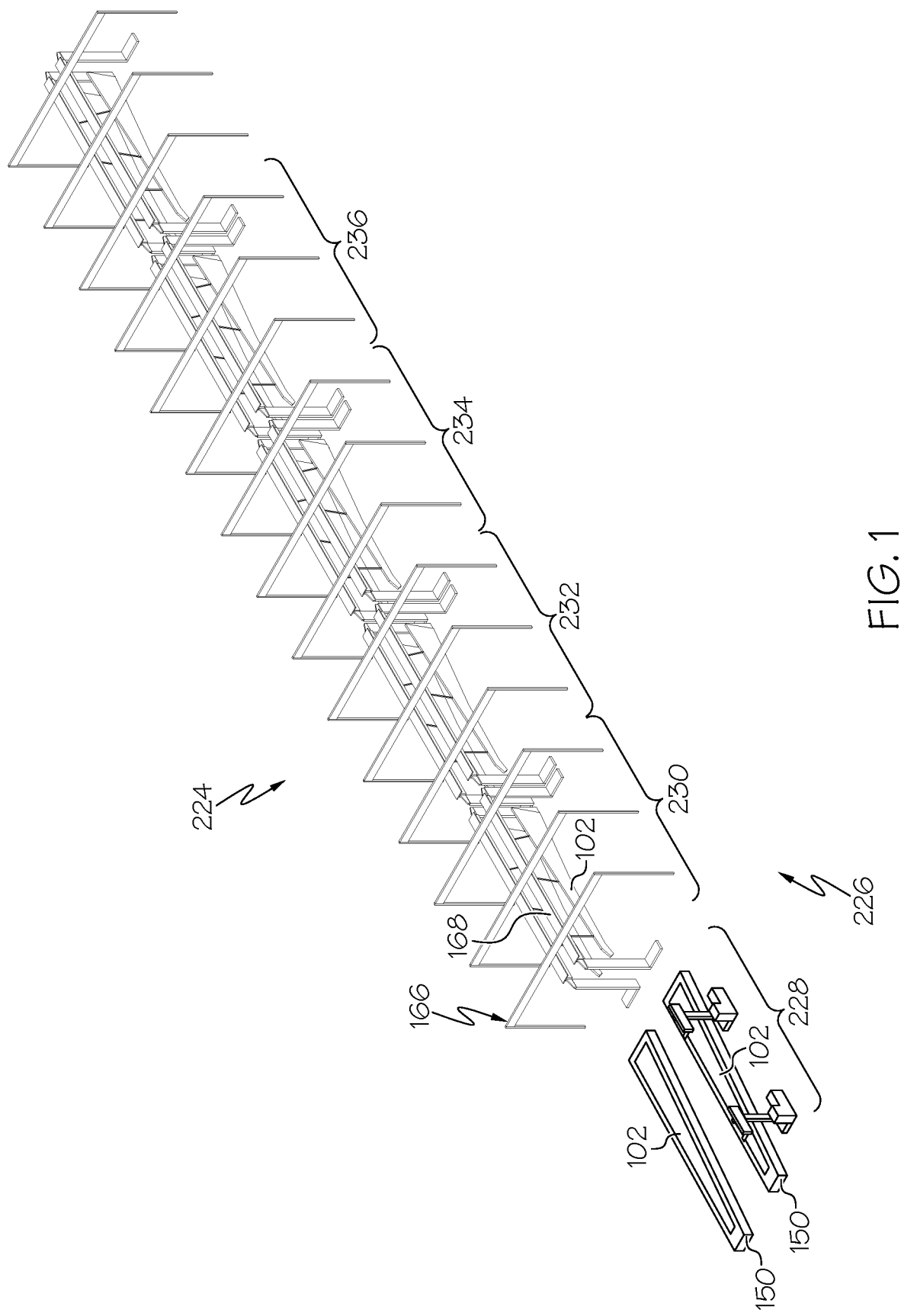
FIG. 1 is a schematic illustration of an example of a manufacturing environment for processing of a workpiece.

Referring now to FIG. 1, in one or more examples, a manufacturing environment 224 facilitates processing of the workpiece 102, such as machining (e.g., drilling, boring, milling, routing, etc.), trimming (e.g., cutting), coating, painting, sub-assembly (e.g., assembly of other parts of components to the workpiece 102), and the like. In reference to a composite workpiece, the processing refers to post-cure processing of the workpiece 102.

Generally, the manufacturing environment 224 includes a plurality of work cells 226, identified individually as a first work cell 228, a second work cell 230, a third work cell 232, a fourth work cell 234, a fifth work cell 236, etc. The manufacturing environment 224 may include any number of work cells 226, depending, for example, on a number of processing operations to be performed on the workpiece 102.

Each one of the work cells 226 facilitates or corresponds to a different processing operation associated with the manufacture of the workpiece 102. In one or more examples, each one of the work cells 226 includes one or more systems, sub-systems, apparatuses, and/or machines (not shown in FIG. 1) that perform at least one processing operation. In one or more examples, the work cells 226 are interlinked (e.g., in series or in parallel) and cooperate to automate at least a portion of the fabrication process.

In one or more examples, the system 100 includes, or is associated with, at least one of the work cells 226. In an example, at least a portion of the system 100 (e.g., one or more components of the system 100) is associated with the second work cell 230 (e.g., as shown in FIGS. 3-7). In another example, at least a portion of the system 100 (e.g., one or more components of the system 100) is associated with another one of the work cells 226. In one or more examples, the system 100 forms a sub-system of the manufacturing environment 224.

In one or more examples, the system 100 facilitates transporting the workpiece 102 through the work cells 226. In one or more examples, the system 100 also facilitates holding the workpiece 102 in each one of the work cells 226. In one or more examples, the system 100 further facilitates performing at least one processing operation on the workpiece 102 in each one of the work cells 226. In one or more examples, the system 100 additionally facilitates damping machine-induced vibrations in the workpiece 102 during the processing operation.

In one or more examples, the system 100 also facilitates indexing the workpiece 102 relative to each one of the work cells 226. In one or more examples, the system 100 further facilitates conforming the workpiece 102 to a desired shape in each one of the work cells 226. In one or more examples, the system 100 additionally facilitates generating and/or updating a digital model of the workpiece 102 after a processing operation is performed on the workpiece 102.

Figure 2:
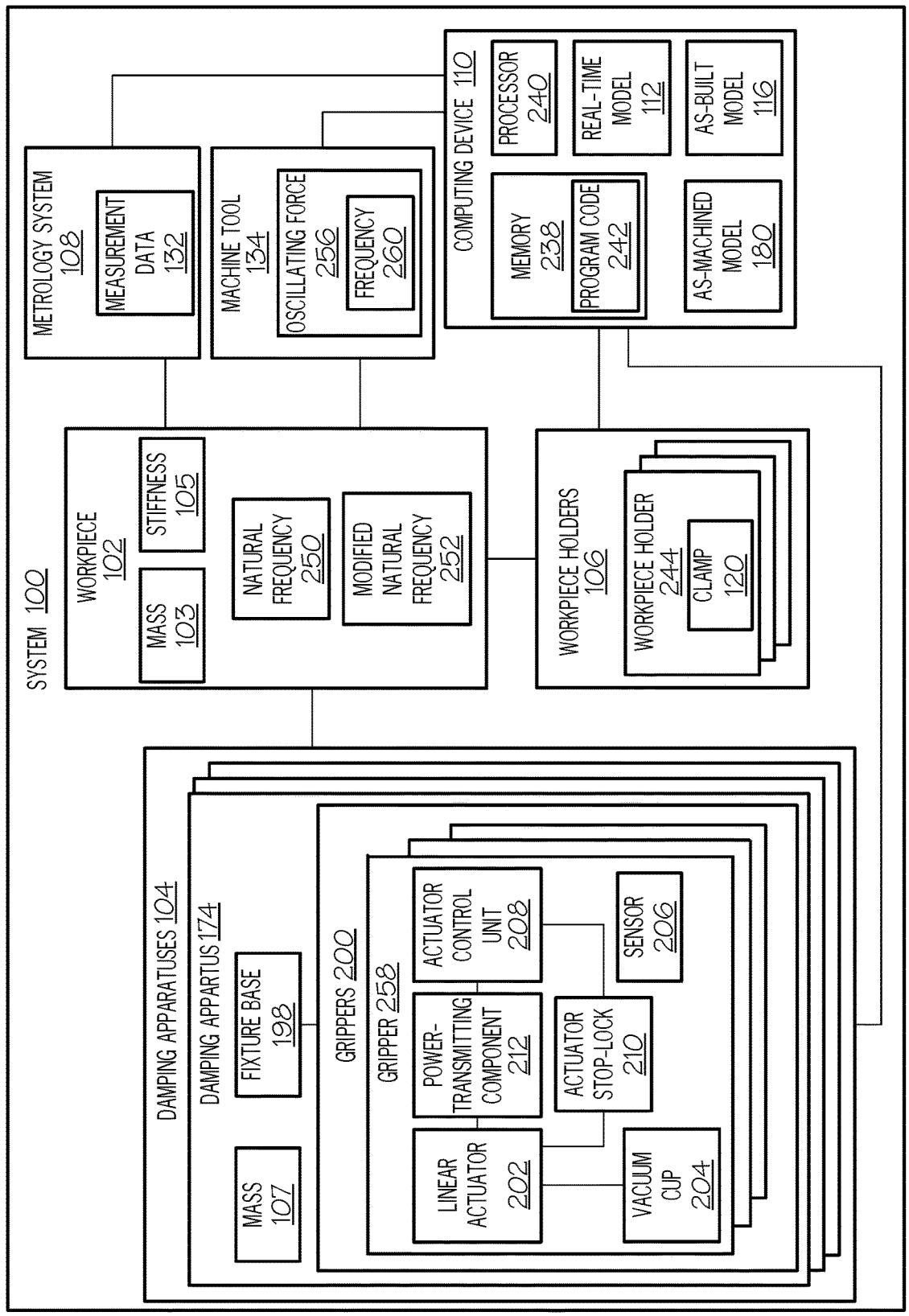
FIG. 2 is a schematic block diagram of an example of a system for damping machine-induced vibrations.

Referring now to FIG. 2, in one or more examples, the system 100 includes a plurality of workpiece holders 106. The workpiece holders 106 hold the workpiece 102 in one of the work cells 226 (e.g., the second work cell 230 as shown in FIGS. 3-6). In one or more examples, more than one of the work cells 226 (e.g., the second work cell 230, the third work cell 232, the fourth work cell 234, etc.) includes the workpiece holders 106.

Figure 4:
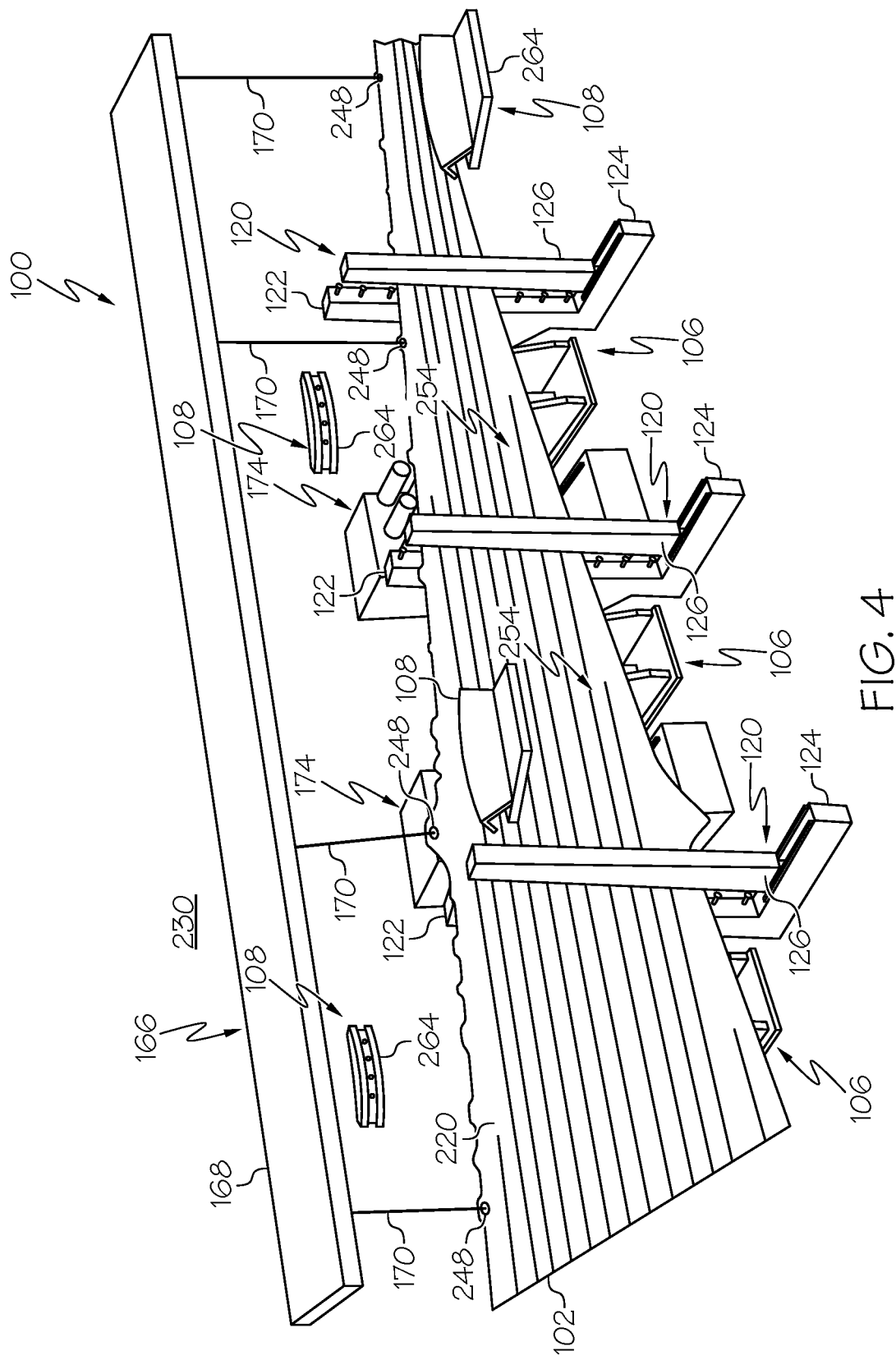
FIG. 4 is a schematic, perspective view of an example of a portion of the system, depicting the plurality of workpiece holders, an overhead workpiece handler, the workpiece held by the plurality of workpiece holders and the overhead workpiece handler, the plurality of damping apparatuses, and a metrology system.
Figure 6:
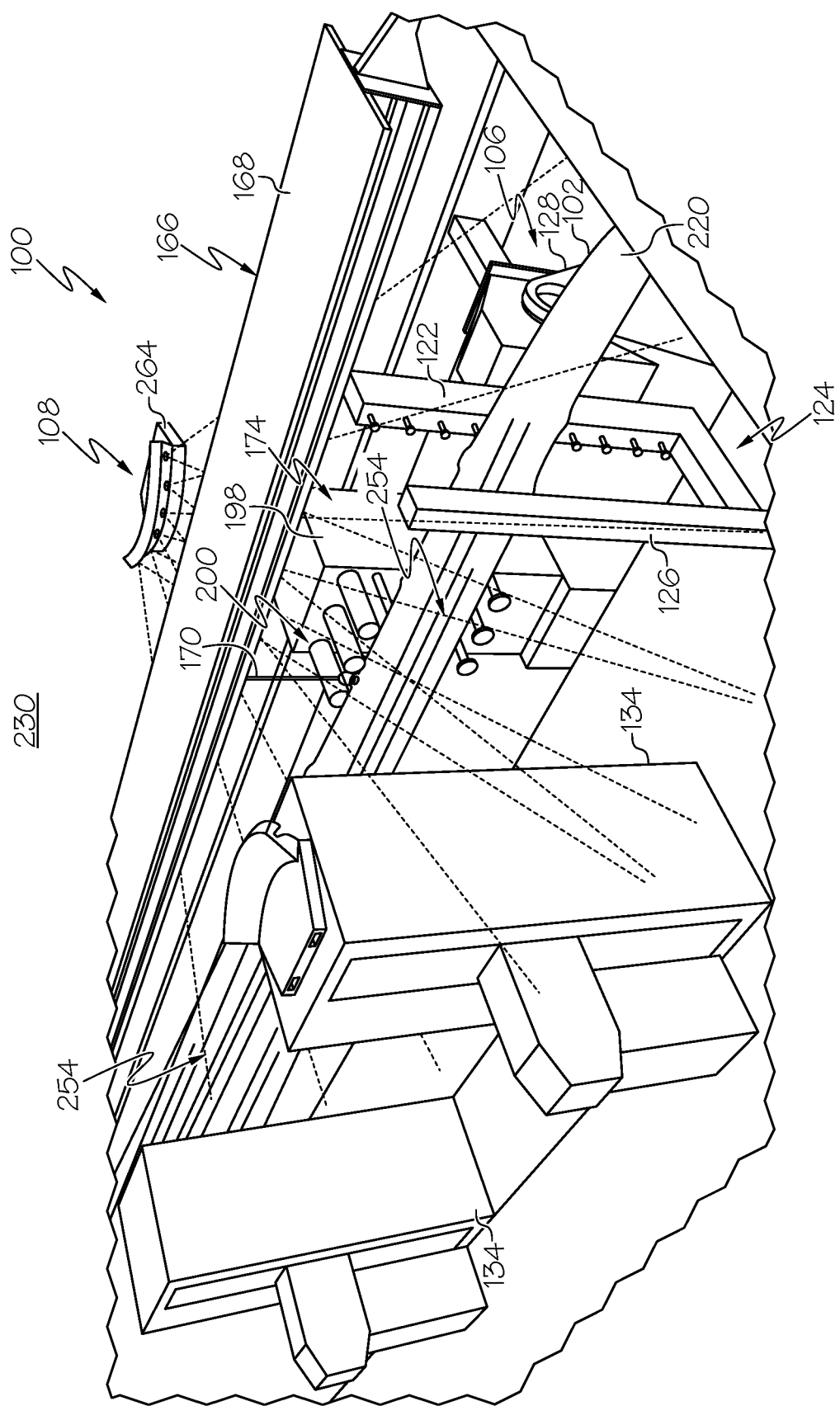
FIG. 6 is a schematic illustration of an example of a portion of the system, depicting the plurality of workpiece holders, the overhead workpiece handler, the workpiece held by the plurality of workpiece holders and the overhead workpiece handler, one of the plurality of damping apparatuses, the metrology system, and a plurality of machine tools.

In one or more examples, the system 100 includes a machine tool 134, which may also be referred to as a machining tool. The machine tool 134 is positioned in one of the work cells 226 (e.g., the second work cell 230 as shown in FIGS. 4 and 6). The machine tool 134 performs at least one machining operation on the workpiece 102 while the workpiece 102 is held by the workpiece holders 106. In one or more examples, more than one of the work cells 226 (e.g., the second work cell 230, the third work cell 232, the fourth work cell 234, etc.) includes the machine tool 134.

In one or more examples, the system 100 includes a damping apparatus 174. The damping apparatus 174 is positioned in one of the work cells 226 (e.g., the second work cell 230 as shown in FIGS. 3-7). The damping apparatus 174 is selectively coupled to the workpiece 102. The damping apparatus 174 selectively controls machine-induced vibrations in the workpiece 102 during the machining operation. For example, the damping apparatus 174 reduces vibrations in the workpiece 102 that are induced by the machining operation. In one or more examples, more than one of the work cells 226 (e.g., the second work cell 230, the third work cell 232, the fourth work cell 234, etc.) includes the damping apparatus 174.

Throughout the present disclosure, vibrations in the workpiece 102 that are induced by the machining operation may also be referred to as machine-induced vibrations and refer to vibrations resulting from or induced by interaction between the machine tool 134 and the workpiece 102 during the machining operation.

In one or more examples, the system 100 includes a plurality of damping apparatuses 104. At least one of the damping apparatuses 104 (e.g., the damping apparatus 174) is positioned between a directly adjacent pair of the workpiece holders 106 (e.g., as shown in FIGS. 3-7).

Referring now to FIGS. 3-7, which illustrate examples of the second work cell 230. It can be appreciated that the examples of the second work cell 230, described herein and illustrated in FIGS. 3-7, may be substantially the same as any other one of the work cells 226 (e.g., the third work cell 232, the fourth work cell 234, etc.). For example, any one of the work cells 226 may include substantially the same features (e.g., workpiece holders 106, machine tool 134, damping apparatus 174, etc.) and/or operate in substantially the same manner as the examples of the second work cell 230, while performing the same or a different processing operation as another one of the work cells 226.

Referring to FIGS. 3-6, in one or more examples, each one of the workpiece holders 106 is selectively controlled to index the workpiece 102 in the second work cell 230. For example, with the workpiece 102 held by the workpiece holders 106, the workpiece holders 106 appropriately position the workpiece 102 in the second work cell 230 for performance of a processing operation, for example, performed by the machine tool 134.

Figure 5:
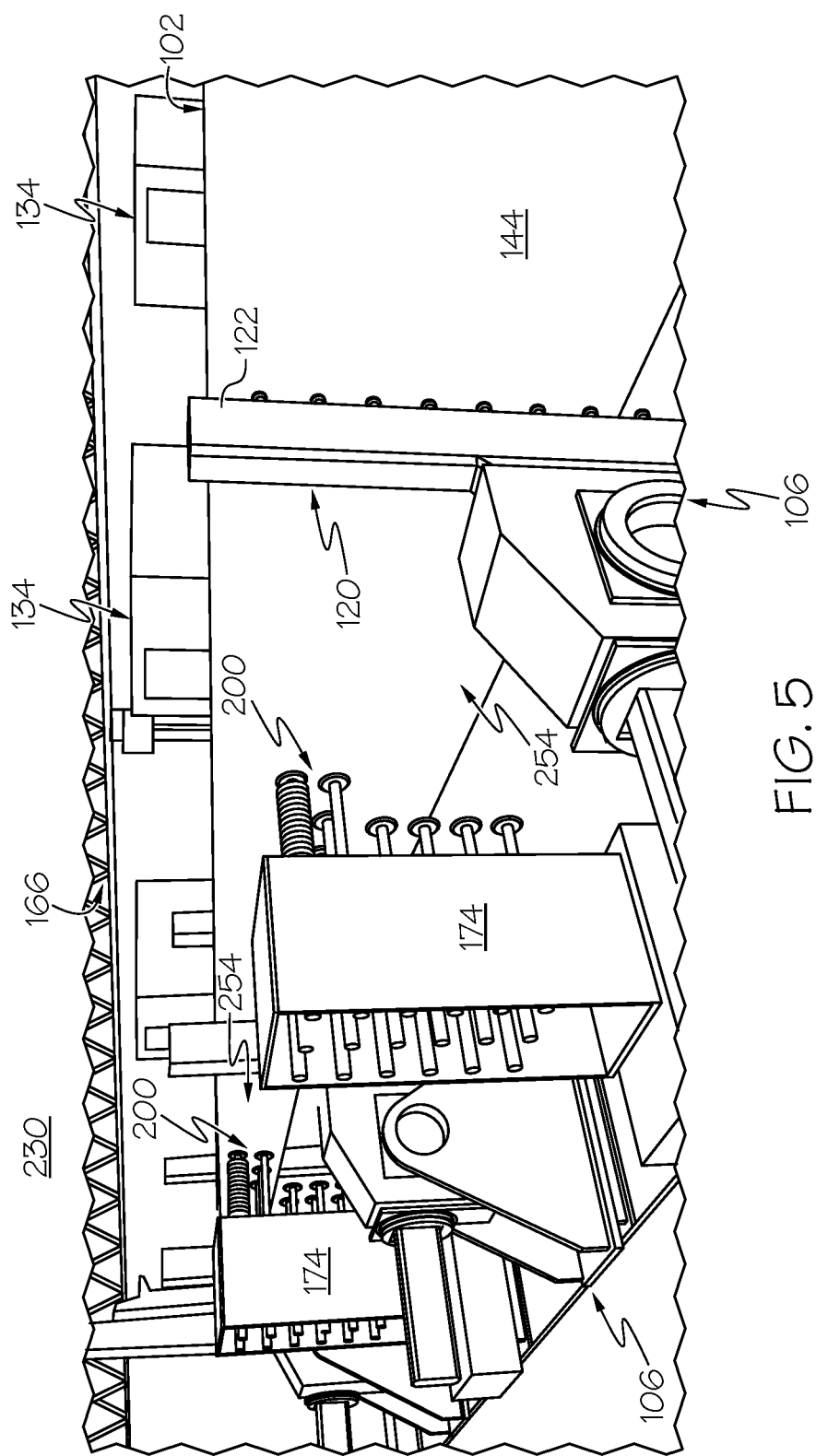
FIG. 5 is a schematic, perspective view of an example of a portion of the system, depicting the plurality of workpiece holders, the overhead workpiece handler, the workpiece held by the plurality of workpiece holders and the overhead workpiece handler, and the plurality of damping apparatuses.

Appropriately positioning and/or indexing the workpiece 102 in each one of the work cells 226 (e.g., the second work cell 230) using the workpiece holders 106 may be performed by any suitable manner or technique. As an example, the workpiece holders 106 utilizes repeatable machine positioning and machine accuracy to appropriately position and/or index the workpiece 102. As another example, the system 100 utilizes a metrology system 108 (e.g., as shown in FIGS. 2, 5 and 6) to provide appropriate positioning and/or indexing of the workpiece 102.

Additionally, in one or more examples, the workpiece holders 106 conform the workpiece 102 to a desired shape of the workpiece 102, for example, before and/or during performance of a processing operation.

In one or more examples, the desired shape of the workpiece 102 is an as-built shape of the workpiece 102. For the purpose of the present disclosure, the term "as-built," such as in reference to an as-built condition or an as-built shape of the workpiece 102, refers to a condition of the workpiece 102 in which the workpiece 102 has a shape (e.g., geometry, profile, contour, structural features, and the like) that is substantially the same as a design or nominal shape of the workpiece 102. In reference to a composite workpiece, the term "as-built," such as in reference to an as-built condition or an as-built shape of the workpiece 102, refers to a condition of the workpiece 102 in which the workpiece 102 has a shape (e.g., geometry, profile, contour, structural features, and the like) that is substantially the same as a shape of the workpiece 102 on a tool upon which the workpiece 102 was cured (e.g., tool 150 as shown in FIG. 1). In other words, as an example, the desired or as-built shape of the workpiece 102 is a shape of the workpiece 102 that is substantially the same as a shape of the workpiece 102 as cured on a tool or mandrel (e.g., tool 150) and prior to separation from the tool or mandrel.

In one or more examples, the desired shape of the workpiece 102 is an as-machined shape of the workpiece 102. For the purpose of the present disclosure, the term "as-machined," such as in reference to an as-machined condition or an as-machined shape of the workpiece 102, refers to a post-processing condition of the workpiece 102 in which the workpiece 102 has a shape (e.g., geometry, profile, contour, structural features, and the like) after a processing operation (e.g., one or more machining operations) is performed on the workpiece 102.

In one or more examples, each one of the workpiece holders 106 (e.g., workpiece holder 244 shown in FIG. 1) includes a base 128 and a clamp 120 that is coupled to the base 128. The clamp 120 is configured to or is operable to clamp (e.g., hold and secure) the workpiece 102 is a predetermined position and prevent movement of the workpiece 102. In one or more examples, the clamp 120 is a C-shaped clamp.

In one or more examples, the clamp 120 of each one of the workpiece holders 106 includes a first jaw 122, a support member 124 that is coupled to the first jaw 122, and a second jaw 126 that is coupled to the support member 124. The second jaw 126 is movable (e.g., linearly movable) along the support member 124 relative to the first jaw 122 to clamp or unclamp the workpiece 102 between the first jaw 122 and the second jaw 126.

In one or more examples, the workpiece 102 includes a first surface 144 and a second surface 220 that is opposite the first surface 144. In one or more examples, the first jaw 122 contacts the first surface 144 and the second jaw 126 contacts the second surface 220 when the workpiece 102 is clamped by the clamp 120.

Figure 3:
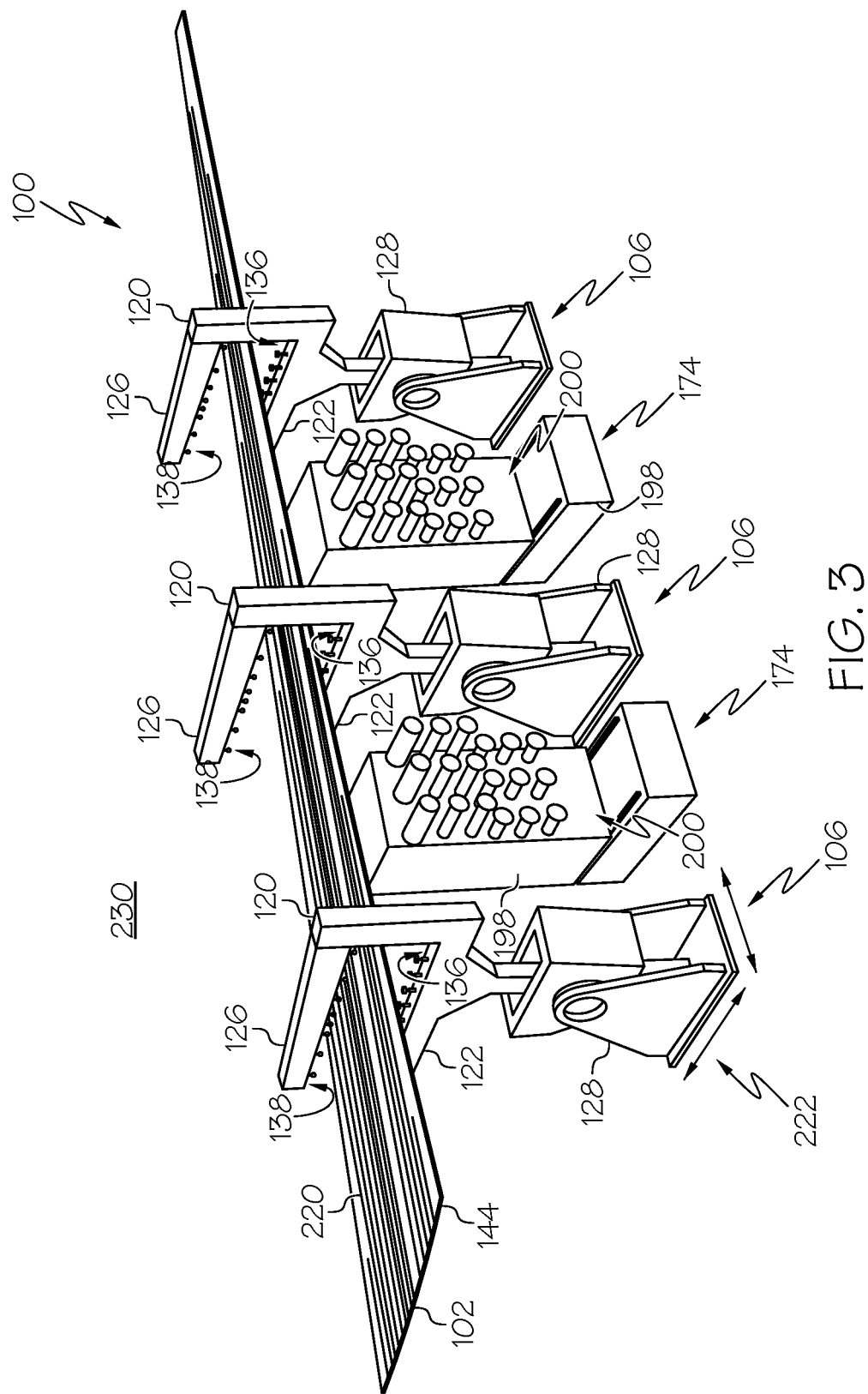
FIG. 3 is a schematic, perspective view of an example of a portion of the system, depicting a plurality of workpiece holders, a workpiece held by the plurality of workpiece holders, and a plurality of damping apparatuses.

Referring briefly to FIGS. 3 and 4, in one or more examples, with the workpiece 102 clamped between the first jaw 122 and the second jaw 126, the second jaw 126 and the first jaw 122 conform the workpiece 102 to the desired shape. In one or more examples, the clamp 120 includes a plurality of numerical control contacts 136. Throughout the present disclosure, the term "numerical control" may be referred to as "NC." The numerical control contacts 136 are located along the first jaw 122. The clamp 120 also includes a plurality of force control contacts 138. The force control contacts 138 are located along the second jaw 126.

Each one of the numerical control contacts 136 is selectively movable (e.g., extendable and retractable) relative to the first jaw 122 to a numerical control location. In one or more examples, the numerical control location for each one of the numerical control contacts 136 is predetermined or preprogrammed, for example, based on the desired shape of the workpiece 102. For example, the numerical control locations correspond to coordinate locations on the first surface 144 of the workpiece 102 represented by an as-built model 116 of the workpiece 102. As such, with each one of the numerical control contacts 136 at the numerical control location, the numerical control contacts 136 match a shape or contour of the first surface 144 of the workpiece 102 having the desired shape.

Each one of the force control contacts 138 is selectively movable (e.g., extendable and retractable) relative to the second jaw 126 to apply a shaping force to the workpiece 102. The shaping force, applied by each one of the force control contacts 138, forces the workpiece 102 against the numerical control contacts 136 to conform the workpiece 102 to the desired shape of the workpiece 102.

In one or more examples, a portion of the first surface 144 of the workpiece 102 is supported on, is support by, or is in contact with one or more of the numerical control contacts 136 before the workpiece 102 is clamped between the first jaw 122 and the second jaw 126. The second jaw 126 is moved toward the first jaw 122 to move the force control contacts 138 toward the second surface 220 of the workpiece 102. In one or more examples, the second jaw 126 is moved toward the first jaw 122 until at least one of the force control contacts 138 is in contact with the second surface 220 of the workpiece 102. In one or more examples, the second jaw 126 is moved toward the first jaw 122 to clamp a portion of the workpiece 102 between the first jaw 122 and the second jaw 126 and, more particularly, between at least one of the numerical control contacts 136 and at least one of the force control contacts 138. With the workpiece 102 initially clamped between the first jaw 122 and the second jaw 126 and, more particularly, between at least one of the numerical control contacts 136 and at least one of the force control contacts 138, each one of the force control contacts 138 moves into contact with the second surface 220 of the workpiece 102 and applies the shaping force to urge the portion of the workpiece 102 toward and against the numerical control contacts 136.

In one or more examples, the clamp 120 is movable relative to the base 128. For example, the clamp 120 is linearly movable along at least one axis and/or is rotationally moveable about at least one axis relative to the base 128. With the workpiece 102 clamped by the clamp 120, movement of the clamp 120 relative to the base 128 appropriately positions (e.g., indexes) the workpiece 102 in the second work cell 230. With the workpiece 102 unclamped (e.g., released) from the clamp 120, movement of the clamp 120 relative to the base 128 appropriately positions the clamp 120 in the second work cell 230 and/or relative to the workpiece 102.

In one or more examples, the base 128 is movable relative to the second work cell 230. For example, the base 128 is linearly movable along at least one axis and/or is rotationally moveable about at least one axis relative to the second work cell 230. With the workpiece 102 clamped by the clamp 120, movement of the base 128 appropriately positions (e.g., indexes) the workpiece 102 in the second work cell 230. With the workpiece 102 unclamped from the clamp 120, movement of the base 128 appropriately positions the clamp 120 in the second work cell 230 and/or relative to the workpiece 102.

In one or more examples, with the workpiece 102 held by the clamp 120 of each one of the workpiece holders 106, the clamp 120 rotates relative to the base 128 to adjust an angular orientation of the workpiece 102. For example, the workpiece holders 106 rotate the workpiece 102 from a first orientation (e.g., approximately horizontal as shown in FIG. 3) to a second orientation (e.g., approximately vertical as shown in FIGS. 4 and 5) for performance of a processing operation. In the illustrated examples, the workpiece 102 is loaded onto the workpiece holders 106 in an approximately horizontal orientation (e.g., as shown in FIG. 3) and is repositioned to an approximately vertical orientation (e.g., as shown in FIGS. 4-6) for performance of a machining operation. However, in other examples, the workpiece 102 is loaded onto the workpiece holders 106 in an approximately vertical orientation and is repositioned to an approximately horizontal orientation for performance of a machining operation. In yet still other examples, the workpiece 102 is loaded onto the workpiece holders 106 in an approximately horizontal or vertical orientation and is maintained in that orientation for performance of a machining operation, while being selectively positioned for indexing. The orientation of the workpiece 102 when being loaded onto the workpiece holders 106 and/or while undergoing a machining operation may depend on various factors, such as, but not limited to, the configuration (e.g., geometry, size, shape, material composition, etc.) of the workpiece 102, the type of machining operation performed on the workpiece 102, the type of machine tool 134 performing the machining operation, and the like.

In one or more examples, the workpiece 102 is initially positioned or loaded in the clamp 120, between the first jaw 122 and the second jaw 126, in the first orientation (e.g., approximately horizontal orientation as shown in FIG. 3). With the workpiece 102 in the first orientation (e.g., approximately horizontal orientation), the clamp 120 clamps the workpiece 102 between the first jaw 122 and the second jaw 126 and, more particularly, between the numerical control contacts 136 and the force control contacts 138. In one or more examples, the numerical control contacts 136 and the force control contacts 138 conform the workpiece 102 to the desired shape.

As illustrated in FIGS. 3-6, in one or more examples, the clamp 120 rotationally moves relative to the base 128 to move the workpiece 102 from the first orientation (e.g., approximately horizontal orientation) to the second orientation (e.g., approximately vertical orientation as shown in FIGS. 4 and 5). In one or more examples, a processing operation (e.g., drilling operation) is performed on the workpiece 102 in the second orientation (e.g., approximately vertical orientation as shown in FIG. 5). Additionally, movement of the clamp 120 relative to the base 128 and/or movement of the base 128 relative to the second work cell 230 indexes the workpiece 102 for performance of the processing operation.

Referring now to FIGS. 4 and 5, in one or more examples, the damping apparatus 174 is selectively coupled to the workpiece 102 after the workpiece holders 106 position (e.g., index) the workpiece 102 in the second work cell 230 and/or after the workpiece holders 106 conform the workpiece 102 to the desired shape (e.g., when performed). In one or more examples, the damping apparatus 174 is selectively coupled to the first surface 144 of the workpiece 102.

In the illustrated examples, the workpiece holders 106 position and hold the workpiece 102 in an upright or upstanding position such that the first surface 144 of the workpiece 102 is generally oriented in an approximately vertical position. In such examples, the damping apparatus 174 access, engages and is coupled to the workpiece 102 from the side. In other examples (not shown), the workpiece holders 106 position and hold the workpiece 102 in a side lying or prostrate position such that the first surface 144 of the workpiece 102 is in an approximately horizontal orientation. In such examples, the damping apparatus 174 access, engages and is coupled to the workpiece 102 from the top or the bottom.

In one or more examples, the damping apparatus 174 selectively controls a natural frequency 250 (FIG. 2) of the workpiece 102. In one or more examples, the damping apparatus 174 selectively modifies the natural frequency 250 (FIG. 2) of the workpiece 102. For example, with the damping apparatus 174 coupled to the workpiece 102, the damping apparatus 174 selectively controls or modifies the natural frequency 250 of a portion of the workpiece 102, for example, a portion 254 (e.g., as shown in FIGS. 4 and 5) of the workpiece 102 that extends between the directly adjacent pair of the workpiece holders 106.

The natural frequency 250 of the workpiece 102, or any portion of the workpiece 102 (e.g., portion 254), is the frequency at which the workpiece 102 resonates or tends to oscillate.

In one or more examples, the natural frequency 250 of the workpiece 102, or of a portion (e.g., the portion 254) of the workpiece 102, is selectively controlled or otherwise modified by increasing a mass 103 (e.g., as shown in FIG. 2) of the portion 254 of the workpiece 102 using the damping apparatus 174. For example, with the damping apparatus 174 coupled to the portion 254 of the workpiece 102, the mass 103 of the portion 254 is increased by a mass 107 (e.g., as shown in FIG. 2) of the damping apparatus 174.

In one or more examples, the natural frequency 250 of the workpiece 102, or of a portion of the workpiece 102, is modified by increasing a stiffness 105 of a portion of the workpiece 102. For example, with the damping apparatus 174 coupled to the portion 254 of the workpiece 102, the stiffness 105 of the portion 254 is increased by connection of the damping apparatus 174.

In one or more examples, the natural frequency 250 of the portion 254 of the workpiece 102 is selectively controlled or modified such that the natural frequency 250 of the portion 254 of the workpiece 102 is different than a frequency 260 of an oscillating force 256 (FIG. 2) applied to the workpiece 102 by the machine tool 134 during the machining operation.

The oscillating force 256 is an external, periodic force that is applied to the workpiece 102 by the machine tool 134 during the machining operation. The oscillating force 256 induces forced oscillations to occur in the workpiece 102, which generate vibrations. It can be appreciated that when the frequency 260 of the oscillating force 256 applied to the workpiece 102 is near the natural frequency 250 of the workpiece 102, or the portion 254 of the workpiece 102, the amplitude of the oscillation becomes large. Therefore, using the damping apparatus 174 to modify the natural frequency 250 of the portion 254 of the workpiece 102 to be different than the frequency 260 of the oscillating force 256 reduces the amplitude of the oscillations and, thereby, reduces the machine-induced vibration in the workpiece 102.

In one or more examples, the natural frequency 250 of the workpiece 102, or at least a portion (e.g., portion 254) of the workpiece 102, is modified or selectively controlled such that a modified natural frequency 252 of at least a portion of the workpiece 102 is within a desired or predetermined range of frequencies (e.g., frequency range). As such, the modified natural frequency 252 can be tuned based on placement of the damping apparatus 174. For the purpose of the present disclosure, the modified natural frequency 252 refers to the natural frequency 250 of at least a portion of the workpiece 102 as modified and selectively controlled by the damping apparatus 174. Generally, the natural frequency 250 of at least a portion of the workpiece 102 is selectively controlled by the damping apparatus 174 such that the modified natural frequency 252 of at least a portion of the workpiece 102 is within the desired frequency range that is suitable to reduce the machine-induced vibrations in the workpiece 102 resulting from the machining operation.

In one or more examples, the natural frequency 250 of the portion 254 of the workpiece 102 is modified such that the natural frequency 250 (e.g., modified natural frequency 252) of the portion 254 of the workpiece 102 is less than the frequency 260 of the oscillating force 256 applied to the workpiece 102 by the machine tool 134 during the machining operation.

In one or more examples, the natural frequency 250 of the portion 254 of the workpiece 102 is modified such that the natural frequency 250 (e.g., modified natural frequency 252) of the portion 254 of the workpiece 102 is less than approximately one-half of the frequency 260 of the oscillating force 256 applied to the workpiece 102 by the machine tool 134 during the machining operation. Selectively controlling the natural frequency 250 such that the modified natural frequency 252 of at least a portion (e.g., portion 254) of the workpiece 102 is less than approximately one-half of the frequency 260 of the oscillating force 256 applied to the workpiece 102 provides the desired frequency range enables selective control (e.g., reduction) of the machine-induced vibrations.

In one or more examples, the natural frequency 250 of the portion 254 of the workpiece 102 is modified such that the natural frequency 250 of the portion 254 of the workpiece 102 is less than approximately one-third of the frequency 260 of the oscillating force 256 applied to the workpiece 102 by the machine tool 134 during the machining operation. Selectively controlling the natural frequency 250 such that the modified natural frequency 252 of at least a portion (e.g., portion 254) of the workpiece 102 is less than approximately one-third of the frequency 260 of the oscillating force 256 applied to the workpiece 102 provides the desired frequency range enables selective control (e.g., further reduction) of the machine-induced vibrations.

Referring now to FIGS. 3-5 and 7, in one or more examples, the damping apparatus 174 includes a fixture base 198 and a plurality of grippers 200. Each one of the grippers 200 is coupled to the fixture base 198. Each one of the grippers 200 is selectively movable (e.g., selectively extendable and retractable) relative to the fixture base 198. For example, each one of the grippers 200 is configured to selectively extend or retract relative to the fixture base 198 such that one or more of the grippers 200 contacts and connects to the workpiece 102, such as to a portion of the first surface 144 of the workpiece 102. Connection of one or more of the grippers 200 to the workpiece 102 selectively controls or modifies the natural frequency 250 of the workpiece 102. In other words, selective extension and retraction of the grippers 200 enables connection of select ones of the grippers 200 to the workpiece 102, thereby, enabling selective control of the natural frequency 250 of the workpiece 102.

In one or more examples, extension of select ones of the grippers 200 also enables connection to the workpiece 102 at locations on a surface of the workpiece 102 where a shape or contour of the surface of the workpiece 102 is compatible or suitable for mating and connection by the grippers 200. Similarly, retraction of select ones of the grippers 200 also enables the damping apparatus 174 to avoid locations on the surface where a shape, contour, or other feature of the surface of the workpiece 102 is incompatible or difficult for mating and connection by the grippers 200.

Figure 8:
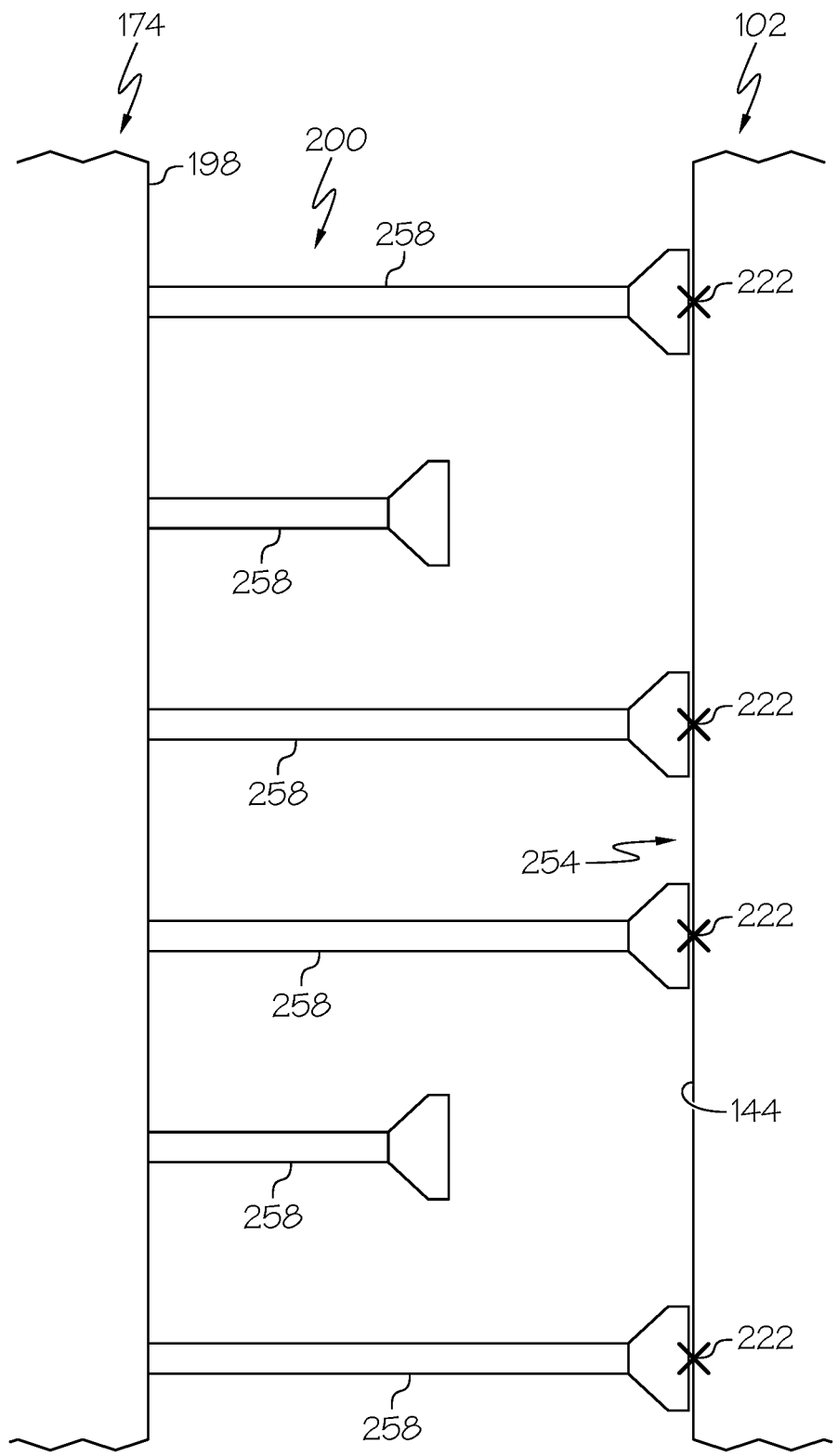
FIG. 8 is a schematic illustration of an example of a portion of one of the damping apparatuses, depicting a selection of a plurality of grippers connected to the workpiece at a plurality of selected locations.
Figure 12:
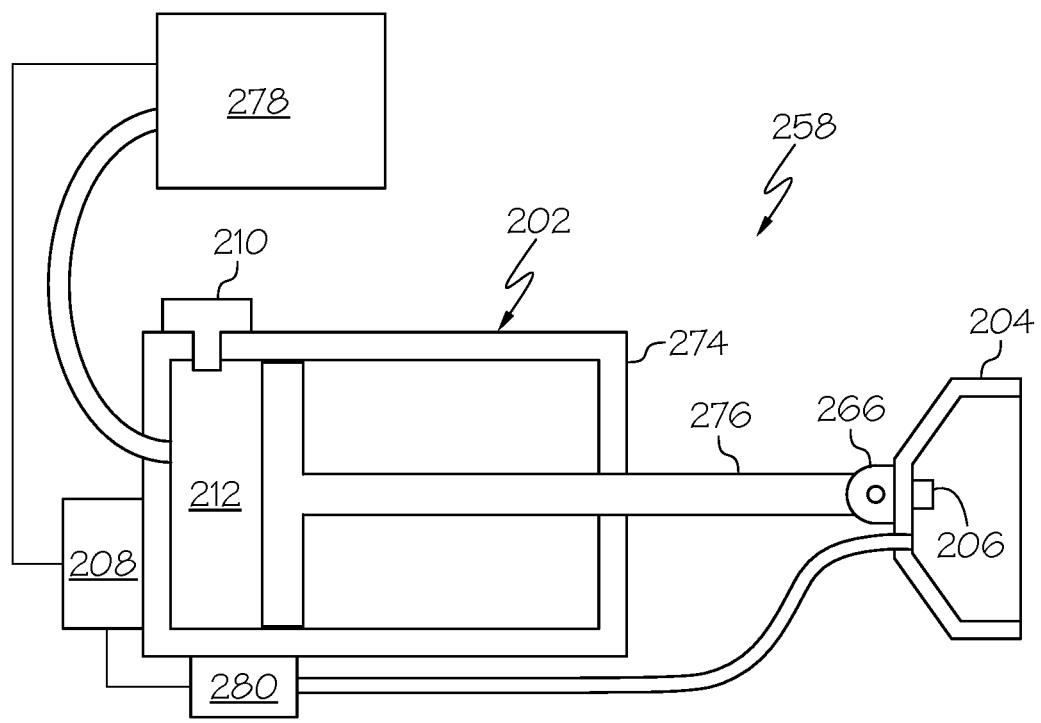
FIG. 12 is a schematic, sectional view of an example of one of the plurality of grippers.

Referring now to FIG. 8, in one or more examples, the natural frequency 250 (FIG. 1) of the portion 254 of the workpiece 102 is selectively controlled or modified by selecting one or more locations 222 of the portion 254 of the workpiece 102 (e.g., on the first surface 144) and selectively connecting one or more of the grippers 200 to the workpiece 102 at the one or more locations 222 (e.g., as shown in FIG. 12).

In one or more examples, an intensity supplied by each one of the grippers 200 in contact with and connected to the workpiece 102 can be varied or selectively controlled to effectuate a desired change in a local or global frequency of the workpiece 102.

Referring now to FIGS. 2 and 8, in one or more examples, the system 100 includes a computing device 110. The computing device 110 is adapted to manipulate data representing the workpiece 102 and data representing the damping apparatus 174 and/or the workpiece holders 106. The computing device 110 is also adapted to provide operating instructions to the damping apparatus 174, the workpiece holders 106 and/or the machine tool 134.

In one or more examples, the damping of machine-induced vibrations and the natural frequency 250 if the workpiece 102 is modified or selectively controlled dependent upon a measured frequency as different machining operations are performed at different locations on the workpiece 102 and/or from workpiece 102 to workpiece 102. In one or more examples, the damping of machine-induced vibrations and the natural frequency 250 if the workpiece 102 is customized to each workpiece 102 and/or for a particular location on or portion of the workpiece 102.

In one or more examples, the workpiece holders 106 are selectively controlled (e.g., by instructions provided by the computing device 110) to index the workpiece 102 within one of the work cells 226 (e.g., the second work cell 230). For example, the computing device 110 is programmed with an indexed position of the workpiece 102 based on a virtual indexed position of a digital model (e.g., a nominal model or an as-built model) of the workpiece 102 in the second work cell 230. The computing device 110 is operable to instruct the workpiece holders 106 to move the workpiece 102 to the indexed position.

In one or more examples, the workpiece holders 106 are selectively controlled (e.g., by instructions provided by the computing device 110) to conform the workpiece 102 to the desired shape (e.g., the as-built shape). For example, the computing device 110 is programmed with the numerical control locations for each one of the numerical control contacts 136 and the shaping force applied to the workpiece 102 by the each one of the force control contacts 138, for example, based on a digital model (e.g., a nominal model or an as-built model) of the workpiece 102. The computing device 110 is operable to instruct the workpiece holders 106 to selectively extend or retract corresponding ones of the numerical control contacts 136 and the force control contacts 138 to conform the workpiece 102 to the desired shape or otherwise control the shape of the workpiece 102 as held by the workpiece holders 106.

Referring briefly to FIGS. 1 and 2, in one or more examples, the workpiece 102 (e.g., a composite workpiece) is digitized while on the tool 150 (e.g., as shown in FIG. 1) to capture an as-built shape of the workpiece 102. In one or more examples, the as-built model 116 (e.g., FIG. 2) is generated that represents the workpiece 102 in the as-built shape.

In one or more examples, an initial processing operation (e.g., a machining, drilling, or trimming operation) may be performed on the workpiece 102, for example, while the workpiece 102 is on the tool 150 (e.g., in the first work cell 228). In these examples, the workpiece 102 is digitized after the initial processing operation. As such, the as-built model 116 may also represent initially machined features of the workpiece 102. In one or more examples, the workpiece 102 is removed from the tool 150 and is transported from the first work cell 228 to the workpiece holders 106 of the second work cell 230 for performance of a subsequent processing operation.

In one or more examples, the metrology system 108 is associated with, or forms a portion of, the first work cell 228. In one or more examples, the metrology system 108 is movable into the first work cell 228. In one or more examples, at least a portion of the metrology system 108 is positioned in the second work cell 230.

In one or more examples, the metrology system 108 digitizes the workpiece 102, for example, while the workpiece 102 is on the tool 150. In one or more examples, the metrology system 108 generates measurement data 132 (e.g., as shown in FIG. 2) for the workpiece 102. In one or more examples, the measurement data 132 represents at least a portion of the workpiece 102, for example, while the workpiece 102 is on the tool 150, having the as-built shape. Accordingly, the measurement data 132 may also be referred to as as-built measurement data. In an example, the metrology system 108 digitizes at least the second surface 220 of the workpiece 102 such that the measurement data 132 represents the shape, contour, and features (e.g., edges, holes, etc.) of the second surface 220 of the workpiece 102.

In one or more examples, the measurement data 132 is used to generate the as-built model 116 (e.g., as shown in FIG. 2) that is representative of the workpiece 102. In one or more examples, the computing device 110 is adapted to manipulate the scan data representing the workpiece 102 (e.g., measurement data 132) and/or to generate models representing the workpiece 102 (e.g., the as-built model 116) based on the scanned measurement data generated by the metrology system 108.

Referring to FIG. 2, in one or more examples, the computing device 110 is operable to determine (e.g., approximate) the natural frequency 250 of the workpiece 102, such as of the portion 254 of the workpiece 102. In one or more examples, the computing device 110 determines the natural frequency 250 of the workpiece 102 (e.g., the portion 254)

by analyzing a real-time model 112 (FIG. 2) of the workpiece 102, for example, as held and/or conformed by the workpiece holders 106.

For the purpose of the present disclosure, the term "real-time," such as in reference to a real-time condition or a real-time shape of the workpiece 102, refers to an immediate or present condition of the workpiece 102 at a point in time in which the workpiece 102 has a shape (e.g., geometry, profile, contour, structural features, and the like) as presently positioned, such as before or during a processing operation (e.g., one or more machining operations).

Referring now to FIGS. 2, 4 and 6, in one or more examples, the metrology system 108 is associated with, or forms a portion of, at least one of the work cells 226. In one or more examples, the metrology system 108 is movable into the second work cell 230. In one or more examples, at least a portion of the metrology system 108 is positioned in the second work cell 230.

In one or more examples, the metrology system 108 digitizes the workpiece 102, for example, while the workpiece 102 is held in the second work cell 230 by the workpiece holders 106, for example, in an indexed position and conformed to the desired shape. In one or more examples, the metrology system 108 generates the measurement data 132 (e.g., as shown in FIG. 2) for the workpiece 102. In one or more examples, the measurement data 132 represents at least a portion of the workpiece 102 while the workpiece 102 is positioned (e.g., indexed) in the second work cell 230 by the workpiece holders 106 and has the desired shape, for example, as held by the workpiece holders 106. Accordingly, the measurement data 132 may also be referred to as real-time measurement data.

In an example, the metrology system 108 digitizes at least the first surface 144 of the workpiece 102 such that the measurement data 132 represents the shape, contour, and features (e.g., edges, holes, etc.) of the first surface 144 of the workpiece 102. In another example, the metrology system 108 digitizes at least the second surface 220 of the workpiece 102 such that the measurement data 132 represents the shape, contour, and features (e.g., edges, holes, etc.) of the second surface 220 of the workpiece 102. In yet another example, the metrology system 108 digitizes the first surface 144 and the second surface 220 of the workpiece 102 such that the measurement data 132 represents the shape, contour, and features (e.g., edges, holes, etc.) of the first surface 144 and the second surface 220 of the workpiece 102.

In one or more examples, the measurement data 132 is used to generate the real-time model 112 (e.g., as shown in FIG. 2) that is representative of the workpiece 102. In one or more examples, the computing device 110 is adapted to manipulate the scan data representing the workpiece 102 (e.g., measurement data 132) and/or to generate models representing the workpiece 102 (e.g., the real-time model 112) based on the scanned measurement data generated by the metrology system 108.

In one or more examples, the metrology system 108 includes a scanner 264 (e.g., as shown in FIGS. 5 and 6). In one or more examples, the metrology system 108 includes more than one scanner. For example, the scanner 264 (e.g., one or more scanners) are associated with or are positioned in each one of the work cells 226.

The scanner 264 scans and digitizes at least a portion of the workpiece 102. In one or more examples, the scanner 264 is any one of various types of three-dimensional (3D) scanners. In one or more examples, the scanner 264 includes, or is, a photogrammetric scanner, such as a photogrammetric camera. In other examples, the scanner 264 includes, or is, one of a laser triangulation scanner, a structured light scanner, other laser-based scanners or metrology systems, and the like.

In one or more examples, the scanner 264 of the metrology system 108 captures the geometry (e.g., size and shape), contour (e.g., curvature), physical features (e.g., holes, edges, etc.), and other details of the workpiece 102. Scan data (e.g., measurement data 132) generated the scanner 264 is used by a computer (e.g., the computing device 110) to generate a model of the workpiece 102 (e.g., the real-time model 112, the as-built model 116, etc.). The model of the workpiece 102 is a digital three-dimensional representation of the workpiece 102.

In one or more examples, the computing device 110 is operable to compare the real-time model 112 to the as-built model 116 (or a nominal model of the workpiece 102) of the workpiece 102. For example, the computing device 110 is adapted to perform various transforms (e.g., rigid body transforms and/or coordinate frame transforms) and/or other data manipulation operations (e.g., global best fit operations) to virtually compare the real-time model 112 to the as-built model 116.

In one or more examples, comparison of the real-time model 112 to the as-built model 116 determines whether the workpiece 102 is appropriately indexed in the second work cell 230. In situations where the comparison of the real-time model 112 to the as-built model 116 indicates that the workpiece 102 is not appropriately indexed, the computing device 110 is operable to instruct the workpiece holders 106 to adjust the position of the workpiece 102 in the second work cell 230 based on the comparison, such that the workpiece 102 is appropriately indexed.

In one or more examples, comparison of the real-time model 112 to the as-built model 116 determines whether the workpiece 102 is conformed to the desired shape in the second work cell 230. In situations where the comparison of the real-time model 112 to the as-built model 116 indicates that the workpiece 102 is not conformed to the desired shape, the computing device 110 is operable to instruct the workpiece holders 106 to adjust the clamp 120 (e.g., modify the position and/or orientation of the clamp 120 relative to the workpiece 102, modify the location of the second jaw 126 relative to the first jaw 122, modify the numerical control location of one or more of the numerical control contacts 136, etc.) based on the comparison, such that the workpiece 102 is conformed to the desired shape.

In one or more examples, the computing device 110 determines (e.g., approximates) the natural frequency 250 of the workpiece 102 with the workpiece 102 held by the workpiece holders 106 (e.g., in the indexed position and conformed to the desired shape). In other examples, the computing device 110 determines (e.g., approximates) the natural frequency 250 of the workpiece 102 (e.g., the portion 254) by analyzing additional data and/or other information representing the workpiece 102, such as the geometry, mass, and stiffness of the workpiece 102 (e.g., the portion 254), the locations of the workpiece holders 106 relative to the workpiece 102 (e.g., the location and orientation of the clamp 120 on the workpiece 102), the distance between the adjacent pair of workpiece holders 106, and the like.

In one or more examples, a frequency of the machine-induced vibrations in the workpiece 102 is measured during the machining operation performed by the machine tool 134. The computing device 110 is adapted to analyze the measured frequency at different locations on the workpiece 102 and determine (e.g., calculate) a modification for the natural frequency 250 (e.g., modified natural frequency 252) of the workpiece 102 needed to reduce the machine-induced vibrations, for example, by selecting locations for connection of select ones of the grippers 200, the number of grippers 200 to be connected to the workpiece 102, and the like, thereby increasing the mass 103 and/or the stiffness 105 of at least a portion (e.g., portion 254) of the workpiece 102.

Referring again to FIGS. 2 and 8, in one or more examples, the computing device 110 is further operable to select the one or more locations 222 on the workpiece 102, such as on the portion 254 of the workpiece 102, for connection of the one or more of the grippers 200. The locations 222 for connection of the grippers 200 are selected such that the modified natural frequency 252 (FIG. 2) of the workpiece 102, such as of the portion 254 of the workpiece 102, is less than the frequency 260 of the oscillating force 256 applied to the workpiece 102 by the machine tool 134 during the machining operation.

In one or more examples, the locations 222 on the workpiece 102 are extracted, calculated, or otherwise determined from the real-time model 112 (FIG. 2) and analysis of the natural frequency 250 of the workpiece 102. In one or more examples, selection of the locations for coupling select ones of the grippers 200 based on the analysis of the natural frequency 250 and the frequency 260 of the oscillating force 256 applied to the workpiece 102 by the machine tool 134 (e.g., the machine-induced vibrations resulting from the machining operation) enables the modified natural frequency 252 to be tuned to a desired frequency or frequency range.

Figure 9:
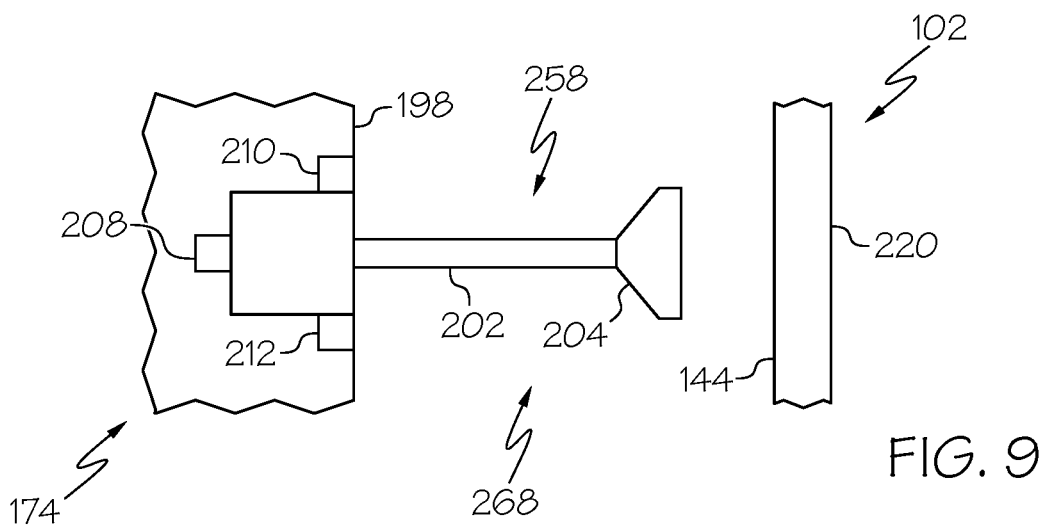
FIG. 9 is a schematic illustration of an example of one of the plurality of grippers, depicted in a first position.

Referring now to FIGS. 7-12, in one or more examples, the damping apparatus 174 has any number of the grippers 200. The grippers 200 may be arranged in any desirable configuration or pattern, such as in an array of rows. In one or more examples, each one of the grippers 200 (e.g., identified individually as a gripper 258 as shown in FIGS. 8-12) includes a linear actuator 202 and a vacuum cup 204. The vacuum cup 204 is coupled to the linear actuator 202. The gripper 258 illustrated in FIGS. 9-12 is an example of any one of the grippers 200 (e.g., as shown in FIGS. 8 and 9).

Figure 10:
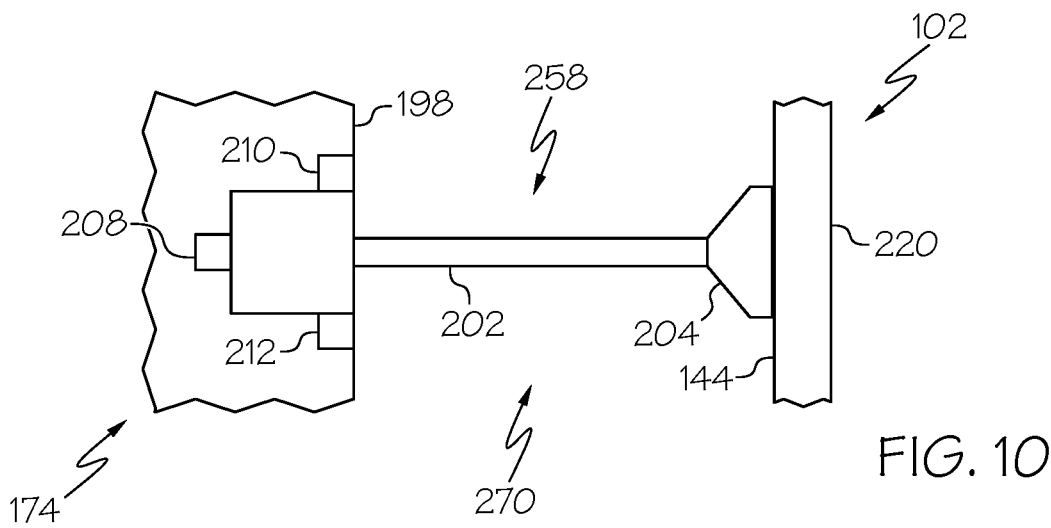
FIG. 10 is a schematic illustration of an example of one of the plurality of grippers, depicted in a second position.
Figure 11:
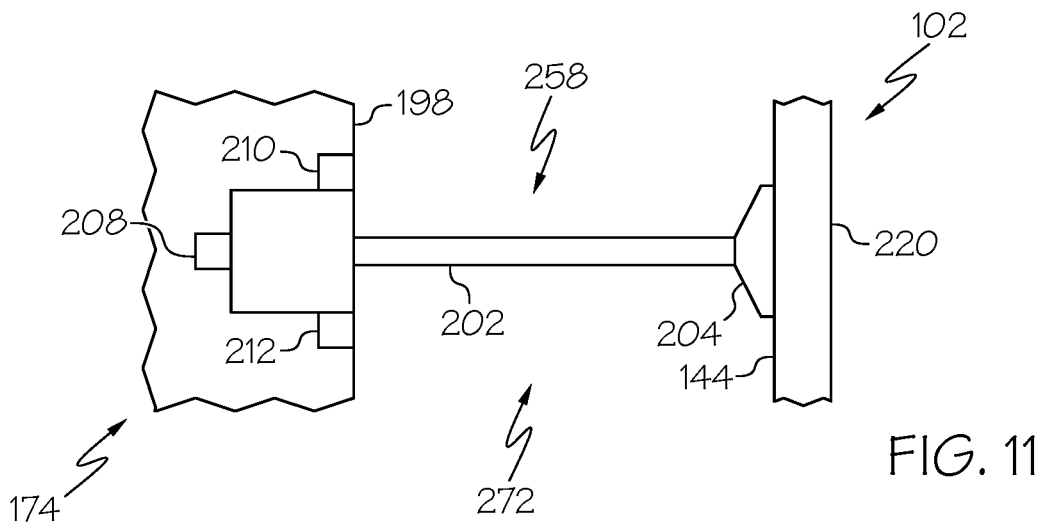
FIG. 11 is a schematic illustration of an example of one of the plurality of grippers, depicted in a third position.

In one or more examples, the linear actuator 202 includes an outboard end that is linearly movable relative to the fixture base 198 along a movement axis. The vacuum cup 204 is located at (e.g., coupled to) the outboard end of the linear actuator 202. As such, the linear actuator 202 linearly moves the vacuum cup 204 relative to the fixture base 198 along the movement axis into selective contact with a surface (e.g., the first surface 144) of the workpiece 102 (e.g., as shown in FIGS. 9-11).

The vacuum cup 204 is configured to grip the workpiece 102 using vacuum. For example, with the vacuum cup 204 in contact with the surface of the workpiece 102, the vacuum cup 204 grips the workpiece 102 using a vacuum formed between the vacuum cup 204 and the surface of the workpiece 102. Upon activation of the vacuum, the vacuum cup 204 provides a holding force that is sufficient to hold the workpiece 102 in a fixed position.

With the vacuum formed between the vacuum cup 204 and the surface of the workpiece 102, the linear actuator 202 is configured to lock linear movement of and, thus, lock a linear position of the vacuum cup 204 along the movement axis. As used herein, "lock" and "locking," for example, in reference to movement and/or position, refers to immobilizing or making the element to which the term refers immovable.

Generally, gripping the workpiece 102 at the locations 222 with the grippers 200 holds the workpiece 102 in a rigidly fixed position between the adjacent pair of workpiece holders 106, which modifies the natural frequency 250 of the workpiece 102 and prevents, or greatly reduces, vibration in the workpiece 102 during the machining operation. In one or more examples, with linear movement of the gripper 258 locked, the outboard end of the linear actuator 202 and the vacuum cup 204 support the workpiece 102 from behind (e.g., backs up the portion 254 of the workpiece 102), opposite to a machining load applied to the workpiece 102 by the machine tool 134, during the machining operation. Accordingly, with the grippers 200 coupled to the workpiece 102 at the locations 222 (e.g., as shown in FIG. 8), the mass 103 and/or stiffness 105 of the portion 254 of the workpiece 102 is increased at the associated one of the locations 222.

Referring to FIGS. 9-11, in one or more examples, the linear actuator 202 moves through a range of movement, for example, between a first position 268 (e.g., as shown in FIG. 9) and a second position 270 (e.g., as shown in FIG. 10). Movement of the linear actuator 202 similar moves the vacuum cup 204 between the first position 268 and the second position 270. The first position 268 refers to any position in which the vacuum cup 204 is not in contact with the workpiece 102 and may be referred to as an unactuated position, a rest position, a retracted position, or a noncontact position. The second position 270 refers to a position in which the vacuum cup 204 is in contact with the workpiece 102 and may be referred to as an actuated position, an extended position, or a contact position.

In one or more examples, with the linear actuator 202 in the second position 270 (e.g., as shown in FIG. 10), a negative pressure generated by the vacuum formed between the vacuum cup 204 and the surface (e.g., first surface 144) of the workpiece 102 moves the linear actuator 202 through a range of motion from the second position 270 to a third position 272 (e.g., as shown in FIG. 11). The third position 272 refers to a position in which the vacuum cup 204 is coupled to the workpiece 102 and may be referred to as a locked position.

In an example, the linear actuator 202 selectively, linearly moves (e.g., extends) the vacuum cup 204 relative to the fixture base 198 and to the surface of the workpiece 102 along the movement axis from the first position 268 (e.g., unactuated position shown in FIG. 9) to the second position 270 (e.g., actuated position shown in FIG. 10) in which the vacuum cup 204 is in contact with the surface of the workpiece 102. With the vacuum cup 204 in contact with the surface of the workpiece 102 (e.g., as shown in FIG. 10), the linear actuator 202 is configured to enable free linear movement along the movement axis. As used herein, free linear movement refers to unrestricted or unobstructed movement of the element to which the term refers. The vacuum formed between the vacuum cup 204 and the surface of the workpiece 102 urges further linear movement (e.g., extension) of the linear actuator 202 along the movement axis into the third position 272 (e.g., the locked position as shown FIG. 11). With the linear actuator 202 in the third position 272, the linear actuator 202 is further configured to fix linear movement along the movement axis, thereby fixing the vacuum cup 204 in the third position 272 (e.g., as shown in FIG. 11).

The vacuum formed between the vacuum cup 204 and the surface of the workpiece 102 securely holds the workpiece 102 and couples the workpiece 102 to the damping apparatus 174. Linear movement (e.g., extension) of linear actuator 202 toward the workpiece 102, rather than movement of the workpiece 102 toward the linear actuator 202, in response to the negative pressure generated by the vacuum, prevents inducing an undesirable load in the workpiece 102. Additionally, fixing the linear position of the linear actuator 202 in the third position 272 supports the workpiece 102, thus, modifying the natural frequency 250 of the workpiece 102.

Referring now to FIGS. 2 and 9-12, in one or more examples, the gripper 258 (e.g., each one of the grippers 200) also includes an actuator control unit 208. In one or more examples, the actuator control unit 208 controls linear movement (e.g., extension and retraction) of the linear actuator 202 to place the vacuum cup 204 in contact with the workpiece 102. In one or more examples, the actuator control unit 208 also controls application of the vacuum.

In one or more examples, the gripper 258 (e.g., each one of the grippers 200) includes a power-transmitting component 212 (e.g., as shown in FIGS. 2 and 12). The power-transmitting component 212 drives linear movement (e.g., extension and retraction) of the linear actuator 202, for example, under direction from the actuator control unit 208. In one or more examples, the power-transmitting component 212 is operatively coupled to a power source 278 (e.g., as shown in FIG. 12).

In one or more examples, the gripper 258 (e.g., each one of the grippers 200) also includes an actuator stop-lock 210. The actuator stop-lock 210 selectively locks a position of the linear actuator 202, for example, under direction from the actuator control unit 208. For example, the actuator stop-lock 210 is operable to fix, or lock, the outboard end of the linear actuator 202 and, thus, the vacuum cup 204 in the third position 272 (e.g., as shown in FIG. 11). In one or more examples, the actuator stop-lock 210 is operatively coupled with the power-transmitting component 212 to lock linear movement of the linear actuator 202 along the movement axis, for example, when the linear actuator 202 is in the third position 272.

Referring briefly to FIG. 12, in one or more examples, the linear actuator 202 includes a stationary member 274 that is coupled to the fixture base 198 and a movable member 276 that is coupled to the stationary member 274. The movable member 276 is linearly movable relative to the stationary member 274 along the movement axis. A free end of the movable member 276 defines the outboard end of the linear actuator 202.

In one or more examples, the power-transmitting component 212 is operatively coupled with the power source 278 and with the stationary member 274 and the movable member 276. The power-transmitting component 212 is operable to selectively drive linear movement of (e.g., extend) the movable member 276 relative to the stationary member 274 along the movement axis, for example, from the first position 268 (e.g., as shown in FIG. 9) to the second position 270 (e.g., as shown in FIG. 10). Once in the second position 270, with the vacuum cup 204 in contact with the surface of the workpiece 102, the power-transmitting component 212 is configured to enable free linear movement of the movable member 276 relative to the stationary member 274. The vacuum created by the vacuum cup 204 linearly moves (e.g., further extends) the movable member 276 from the second position 270 to the third position 272 (e.g., as shown in FIG. 11). The actuator stop-lock 210 is operatively coupled with the power-transmitting component 212 to lock linear movement of the movable member 276 relative to the stationary member 274 along the movement axis, for example, when the linear actuator 202 is in the third position 272.

In one or more examples, the actuator control unit 208 selectively controls linear movement of the linear actuator 202 via control of the power source 278, control of the power-transmitting component 212, and/or control of the actuator stop-lock 210. In one or more examples, the actuator control unit 208 selectively controls application of the vacuum applied by the vacuum cup 204, for example, via control of a vacuum source 280. In one or more examples, the system 100 also includes at least one power supply (not shown) that provides power, as needed, to the various components of the system 100.

Referring still to FIG. 12, in one or more examples, the gripper 258 (e.g., each one of the grippers 200) includes a pivot coupling 266. The pivot coupling 266 pivotally couples the outboard end of the linear actuator 202 and the vacuum cup 204 together. The pivot coupling 266 enables the vacuum cup 204 to pivot relative to the linear actuator 202 about at least one pivot axis. In an example, the movement axis extends through the pivot coupling 266. In an example, the pivot axis is perpendicular to the movement axis. The vacuum cup 204 being pivotable relative to the linear actuator 202 enables self-adjustment of an angular orientation of the vacuum cup 204 relative to the workpiece 102 to accommodate for different shapes and/or contours of the portion 254 of the workpiece 102.

Referring again to FIGS. 2 and 9-12, in one or more examples, the actuator control unit 208 causes engagement of (e.g., activates or energizes) the power-transmitting component 212 to extend the linear actuator 202 from the first position 268 (e.g., as shown in FIG. 9) to the second position 270 (e.g., as shown in FIG. 10), which places the vacuum cup 204 in contact with the workpiece 102. Upon contact of vacuum cup 204 with the workpiece 102, the actuator control unit 208 causes disengagement of (e.g., deactivates or deenergizes) the power-transmitting component 212 to enable free extension of the linear actuator 202. With the vacuum cup 204 in contact with the workpiece 102 and the power-transmitting component 212 disengaged, the actuator control unit 208 applies the vacuum to further extend the linear actuator 202 from the second position 270 to the third position 272 (e.g., as shown in FIG. 11). With the vacuum formed between the vacuum cup 204 and the workpiece 102 and the power-transmitting component 212 disengaged, the actuator control unit 208 engages the actuator stop-lock 210 to lock the linear actuator 202 in the third position 272.

In one or more examples, the linear actuator 202 is a hydraulic linear actuator, the power source 278 is a hydraulic pump, and the power-transmitting component 212 is pressurized hydraulic fluid. In these examples, the stationary member 274 includes a hollow cylinder and the movable member 276 includes a piston located inside the hollow cylinder and a piston rod coupled to the piston (e.g., a free end of the piston rod defines the outboard end of the linear actuator 202). The pressurized hydraulic fluid within the hollow cylinder acts on the piston and drives linear movement of the piston. The actuator stop-lock 210 is a hydraulic valve that is operable to close off the hydraulic system and hydrostatically lock the hydraulic actuator.

In one or more examples, the linear actuator 202 is a pneumatic linear actuator, the power source 278 is a compressor, and the power-transmitting component 212 is pressurized gas (e.g., air). In these examples, the stationary member 274 includes a hollow cylinder and the movable member 276 includes a piston located inside the hollow cylinder and a piston rod coupled to the piston (e.g., a free end of the piston rod defines the outboard end of the linear actuator 202). The pressurized gas within the hollow cylinder acts on the piston and drives linear movement of the piston. The actuator stop-lock 210 is a pneumatic valve that is operable to close off the pneumatic system and lock the pneumatic actuator.

In one or more examples, the linear actuator 202 is a mechanical or electromechanical linear actuator, the power source 278 is a motor, and the power-transmitting component 212 includes a drive mechanism that operates to convert rotary motion of the motor into linear motion of the movable member 276 (e.g., a screw drive, a rack and pinion drive, a chain drive, a belt drive, and the like). In these examples, the stationary member 274 includes a hollow housing and the movable member 276 includes a rod (e.g., a free end of the rod defines the outboard end of the linear actuator 202). The drive mechanism within the hollow housing acts on the rod and drives linear movement of the rod. The actuator stop-lock 210 is a mechanical rod lock that is operable to restrict operation of the drive mechanism.

In one or more examples, the vacuum source 280 is coupled to (e.g., in fluid communication with) the vacuum cup 204. In one or more examples, the vacuum source 280 includes least one vacuum generator that is coupled to (e.g., in fluid communication with) the vacuum cup 204, such as via at least one air line (e.g., hose or tube) that directs a flow of air and at least one air supply valve that controls the flow of air. In an example, the air supply valve is an electrically controlled solenoid valve that is operatively coupled with and commanded by the actuator control unit 208 and/or the computing device 110.

In one or more examples, the power source 278 and/or the vacuum source 280 are dedicated to each one of the grippers 200. In other examples, the power source 278 and/or the vacuum source 280 are shared by more than one of the grippers 200. In these examples, the system 100 includes at least one vacuum supply manifold and/or at least one power supply manifold that distributes vacuum and/or power to more than one of the grippers 200.

Similarly, in one or more examples, the actuator control unit 208 is dedicated to each one of the grippers 200. In other examples, the actuator control unit 208 is shared by more than one of the grippers 200.

Referring now to FIGS. 2 and 12, in one or more examples, the gripper 258 (e.g., each one of the grippers 200) includes a sensor 206. The sensor 206 is configured or is operable to determine when the linear actuator 202 is in the second position 270. In one or more examples, the sensor 206 detects contact of the vacuum cup 204 with the workpiece 102. In one or more examples, the sensor 206 is located at the outboard end of the linear actuator 202. In one or more examples, the sensor 206 is located proximate to the vacuum cup 204.

In one or more examples, the sensor 206 is a position sensor that is operable to detect a position of the outboard end of the linear actuator 202. In one or more examples, the sensor 206 is a contact sensor that is operable to detect when the vacuum cup 204 is in contact with the workpiece 102. In one or more examples, the sensor 206 is a proximity sensor that is operable to detect when the linear actuator 202 (e.g., the outboard end) is near the workpiece 102. Any other suitable type of sensor is also contemplated.

In one or more examples, once the sensor 206 detects that the vacuum cup 204 is in contact with the surface of the workpiece 102 and/or that the linear actuator 202 is in the second position 270 (e.g., as shown in FIG. 10), the linear actuator 202 is commanded to cease linear movement (e.g., extension). Once selectively controlled linear movement (e.g., extension) of the linear actuator 202 has stopped, the linear actuator 202 disengages or releases to enable free linear movement (e.g., extension). The vacuum is then applied to the surface of the workpiece 102 by the vacuum cup 204 to grip the workpiece 102. The vacuum draws, or otherwise pulls, the linear actuator 202 toward the workpiece 102 and positions the linear actuator 202 in the third position 272 (e.g., as shown in FIG. 11).

In one or more examples, the sensor 206 is coupled to or is in communication with the actuator control unit 208 and/or the computing device 110. In one or more examples, the actuator control unit 208 selectively controls linear movement of the linear actuator 202 via control of the power source 278, control of the power-transmitting component 212, and/or control of the actuator stop-lock 210 based on signals from the sensor 206 indicative of the position of the of the linear actuator 202.

Figure 7:
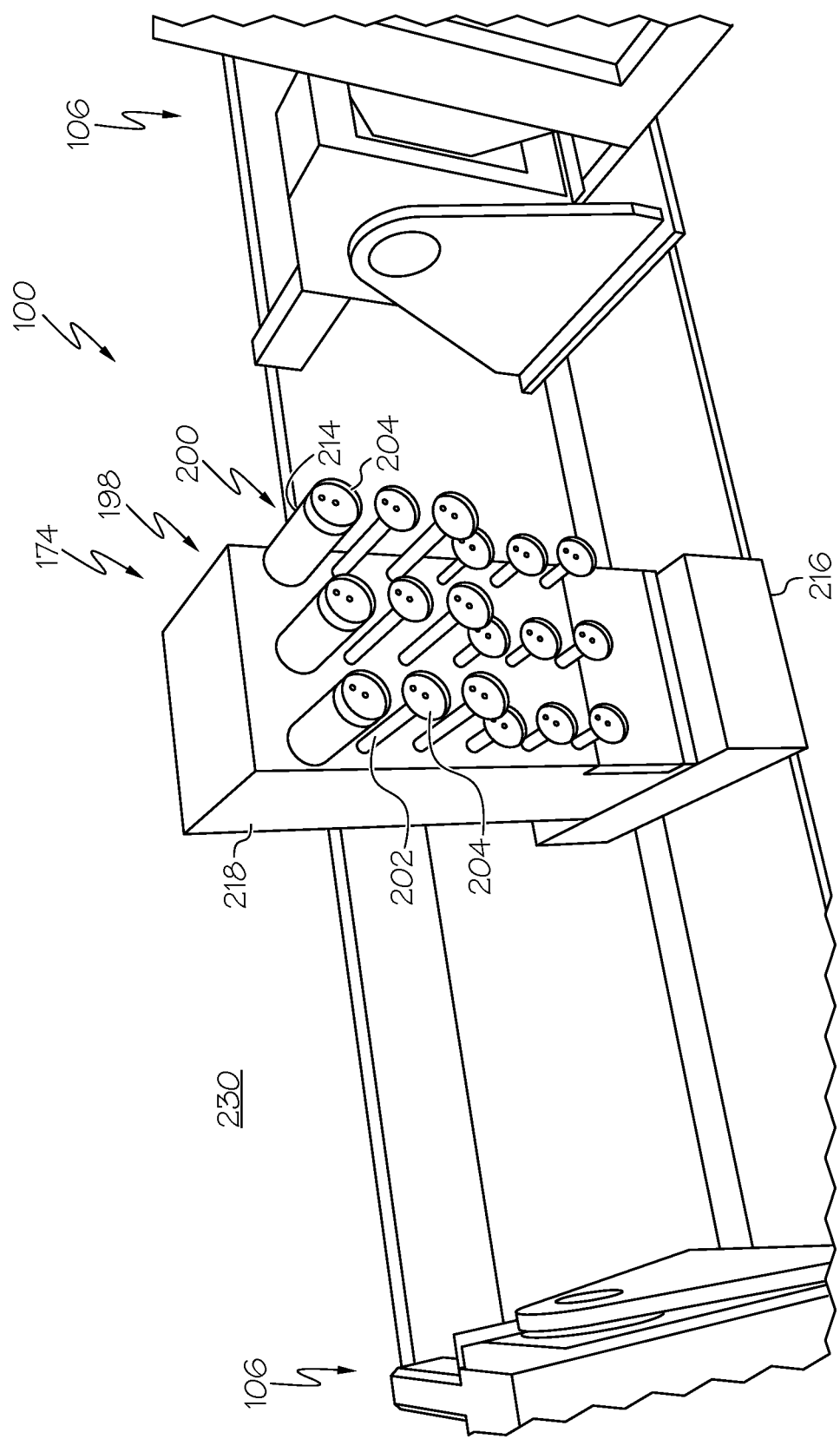
FIG. 7 is a schematic, perspective view of an example of one of the damping apparatuses.

Referring to FIG. 7, in one or more examples, each one of the grippers 200 includes a bellows cover 214. The bellows cover 214 surrounds at least a portion of the linear actuator 202 that is located external to the fixture base 198. The bellows cover 214 is configured to enable linear movement (e.g., extension and retraction) of the linear actuator 202. The bellows cover 214 protects the linear actuator 202 and prevents debris (e.g., from the machining operation) from interacting with the linear actuator 202.

Referring now to FIGS. 3-7, in one or more examples, the damping apparatus 174 (e.g., each one of the damping apparatuses 104) is movable in or relative to one of the work cells 226 (e.g., the second work cell 230) and/or relative to the workpiece 102. In an example, the damping apparatus 174 is linearly moveable along at least one axis to move and locate the grippers 200 relative to the workpiece 102. In another example, the damping apparatus 174 is rotationally movable along at least one axis to move and orient the grippers 200 relative to the workpiece 102.

Referring to FIG. 7, in one or more examples, the fixture base 198 includes a pedestal 216 and a stanchion 218. The stanchion 218 is coupled to the pedestal 216. The grippers 200 are coupled to and are moveable (e.g., extend and retract) relative to the stanchion 218.

In one or more examples, the fixture base 198 is movable in the second work cell 230 and relative to the workpiece 102. Generally, movement of the fixture base 198 relative to the workpiece 102 also moves the grippers 200 relative to the workpiece 102 (e.g., relative to the first surface 144) of the workpiece 102, thereby selectively positioning the grippers 200 relative to a connecting surface (e.g., first surface 144) of the workpiece 102. For example, movement of the fixture base 198 selectively moves and positions the grippers 200 in at least one of a horizontal or vertical direction relative to the first surface 144 of the workpiece 102 (e.g., in a chordwise direction and/or a spanwise direction of a wing panel). In one or more examples, movement of the fixture base 198 relative to the workpiece 102 enables connection of the grippers 200 to the workpiece 102 at locations on a surface of the workpiece 102 where a shape or contour of the surface of the workpiece 102 is compatible or suitable for mating and connection by the grippers 200 and avoidance at locations on the surface where a shape, contour, or other feature of the surface of the workpiece 102 is incompatible or difficult for mating and connection by the grippers 200.

In one or more examples, the stanchion 218 is movable relative to the pedestal 216. In an example, the stanchion 218 is linearly moveable along at least one axis relative to the pedestal 216 to move and locate the grippers 200 relative to the workpiece 102. In another example, the stanchion 218 is rotationally movable along at least one axis relative to the pedestal 216 to move and orient the grippers 200 relative to the workpiece 102.

In one or more examples, the pedestal 216 is movable in a corresponding one of the work cells 226 (e.g., the second work cell 230) relative to the workpiece 102. In an example, the pedestal 216 is linearly moveable along at least one axis to move and locate the stanchion 218 relative to the workpiece 102. In another example, the pedestal 216 is rotationally movable along at least one axis to move and orient the stanchion 218 relative to the workpiece 102.

The principles and implementations of the system 100 disclosed herein enable the digital model to be updated after a machining operation is performed, such that the digital model is representative of an as-machined shape of the workpiece 102. The updated digital model of the workpiece 102 (e.g., in the as-machined shape) may be used to index the workpiece 102 before a subsequent processing operation is performed on the workpiece 102. The updated digital model of the workpiece 102 may also be used to conform the workpiece 102 to the desired shape (e.g., an as-machined shape) during a subsequent processing operation performed on the workpiece 102. The updated digital model of the workpiece 102 may also be used to determine the natural frequency 250 of the workpiece 102 and to select the locations 222 on the workpiece 102 for coupling of the grippers 200 of the damping apparatus 174, which modify the natural frequency 250 to dampen the machine-induced vibrations. As such, the principles of the system 100 disclosed herein also enable determinant assembly or predictive assembly of the workpiece 102 based on the digital model of the workpiece 102, which is updated throughout processing of the workpiece 102.

Referring now to FIG. 6, in one or more examples, the metrology system 108 digitizes the workpiece 102, for example, during and/or after performing the processing operation and while the workpiece 102 is held by the workpiece holders 106 and coupled to the damping apparatus 174. In one or more examples, the metrology system 108 generates the measurement data 132 (e.g., as shown in FIG. 2) for the workpiece 102. In one or more examples, the measurement data 132 represents at least a portion of the workpiece 102 after the machining operation, for example, performed by the machine tool 134. Accordingly, the measurement data 132 may also be referred to as as-machined measurement data.

In an example, the metrology system 108 digitizes at least the first surface 144 of the workpiece 102 such that the measurement data 132 represents the shape, contour, previous features (e.g., prior formed edges, holes, etc.) and newly added features (e.g., newly formed edges, holes, etc.) of the first surface 144 of the workpiece 102. In another example, the metrology system 108 digitizes at least the second surface 220 of the workpiece 102 such that the measurement data 132 represents the shape, contour, previous features (e.g., prior formed edges, holes, etc.) and newly added features (e.g., newly formed edges, holes, etc.) of the second surface 220 of the workpiece 102. In yet another example, the metrology system 108 digitizes the first surface 144 and the second surface 220 of the workpiece 102 such that the measurement data 132 represents the shape, contour, previous features (e.g., prior formed edges, holes, etc.) and newly added features (e.g., newly formed edges, holes, etc.) of the first surface 144 and the second surface 220 of the workpiece 102.

In one or more examples, the measurement data 132 is used to update the digital model of workpiece 102 (e.g., the as-built model 116) or to generate an as-machined model 180 (e.g., as shown in FIG. 2) that is representative of the workpiece 102 having the as-machined shape. Accordingly, the as-machined model 180 represents an update to the as-built model 116, which includes features formed during the machining operation. In one or more examples, the computing device 110 is adapted to manipulate the scan data representing the workpiece 102 (e.g., measurement data 132) and/or to generate models representing the workpiece 102 (e.g., the as-machined model 180) based on the scanned measurement data generated by the metrology system 108.

It can be appreciated that this process implemented by the system 100, as described herein and illustrated in FIGS. 2-12, may be repeated any number of times as the workpiece 102 moves through the other work cells 226 of the manufacturing environment 224. For example, workpiece holders 106 associated with each one of the work cells 226 hold the workpiece 102 during performance of a subsequent processing operation, index the workpiece 102 before performing the subsequent processing operation, and/or conform the workpiece 102 to the desired shape before performing the subsequent processing operation. The damping apparatuses 104 associated with each one of the work cells 226 connect to the workpiece 102 at the locations 222 selected to modify the natural frequency 250 of the workpiece 102 as desired to control (e.g., reduce) vibrations during the processing operation. Additionally, the as-machined model 180 may be generated or updated after each subsequent processing operation, such that, upon completion of all processing operations, the as-machined model 180 represents the workpiece 102 having the as-built shape and all the machined features. As such, the workpiece 102 fabricated in this manner may be used for determinant assembly or predictive assembly of another structure, such as the wing 1220 of the aircraft 1200 (e.g., as shown in FIG. 15).

Referring again to FIG. 1, in one or more examples, the workpiece 102 is successively transported from one of the work cells 226 (e.g., the second work cell 230) to another one of the work cells 226 (e.g., the third work cell 232) for performance of subsequent processing operations. This process may be repeated any number of times to move the workpiece 102 through the work cells 226 and to perform any number of processing operations. The workpiece holders 106 and the damping apparatuses 104 may be used in any one of the work cells 226, as described herein above and illustrated in FIGS. 3-6, to dampen machine-induced vibrations during a machining operation.

In one or more examples, the system 100 includes an overhead workpiece handler 166. The overhead workpiece handler 166 is coupled to the workpiece 102. The overhead workpiece handler 166 supports the workpiece 102 while transporting the workpiece 102 between the work cells 226.

In one or more examples, with the workpiece 102 released from the workpiece holders 106, the overhead workpiece handler 166 transports the workpiece 102 between the work cells 226 of the manufacturing environment 224. For example, the overhead workpiece handler 166 transports the workpiece 102 from the second work cell 230, following the processing operation, to the third work cell 232 for performance of a subsequent processing operation, and so on. In one or more examples, the overhead workpiece handler 166 carries the workpiece in the approximately vertical orientation.

Referring now to FIGS. 4-6, in one or more examples, the overhead workpiece handler 166 supports the workpiece 102 during the processing operation and while the workpiece 102 is held by the workpiece holders 106 and is coupled to the damping apparatus 174.

In one or more examples, the overhead workpiece handler 166 includes a support beam 168 and a plurality of hangers 170. The hangers 170 are connected to the support beam 168 and to the workpiece 102 such that the workpiece 102 is suspended from the support beam 168, such as in the approximately vertical orientation.

In one or more examples, the hangers 170 are connected to the workpiece 102 at, or using, holes 248 machined in the workpiece 102, such that the workpiece 102 is suspended from the hangers 170 by the holes 248. In one or more examples, the holes 248 are machined through the workpiece 102 while the workpiece 102 is on the tool 150 (e.g., in the first work cell 228 as shown in FIG. 1) and has the as-built shape. In one or more examples, the holes 248 are represented in the as-built model 116 and in the real-time model 112 and are used as alignment features during comparison (e.g., transform) of the real-time model 112 to the as-built model 116 for indexing the workpiece 102 and/or for conforming the workpiece 102 to the as-built shape.

Referring again to FIG. 2, in one or more examples, computing device 110 may include a single computer or several interconnected computers. For example, the computing device 110 may include any collection of computing devices that individually or jointly execute a set (or multiple sets) of instructions to implement any one or more of the operations discussed herein. The computing device 110 includes a processor 240 (e.g., at least one processing unit) that is coupled to memory 238. The memory 238 includes program code 242 that is executable by the processor 240 to perform one or more operations.

Generally, as used herein, the phrase "the computing device 110 is adapted to" refers to the computing device 110 being configured or otherwise operable to perform a function, such as the program code 242 being executed by the processor 240 to perform a desired operation or function. The program code 242 is any coded instructions that is (e.g., computer readable and/or machine readable. The memory 238 is any a non-transitory computer readable and/or machine readable medium, such as a hard disk drive, flash memory, read-only memory, a compact disk, a digital versatile disk, a cache, random-access memory, and/or any other storage device or storage disk in which information is stored for any duration (e.g., for extended time periods, permanently, for brief instances, for temporarily buffering, and/or for caching of the information).

In one or more examples, the computing device 110 is adapted to perform various transforms (e.g., rigid body transforms and/or coordinate frame transforms) and/or other data manipulation operations (e.g., global best fit operations) to virtually compare digital models that are representative of the workpiece 102 (e.g., the real-time model 112, the as-built model 116, the as-machined model, etc.). These operations may be used to index the workpiece 102, conform the workpiece 102 to the desired shape, and select the locations 222 for connection of the grippers 200 to modify the natural frequency 250 of the workpiece 102 as desired.

The present disclosure is also directed to a method for damping vibrations in the workpiece 102 using the system 100. The present disclosure is further directed to the workpiece 102 manufactured using the system 100. The present disclosure is additionally directed to the system 100 for damping vibrations in the workpiece 102 that includes the damping apparatus 174 (e.g., at least one of the damping apparatuses 104). The present disclosure is also directed to the damping apparatus 174, such as the plurality of damping apparatuses 104, for damping machine-induced vibrations in the workpiece 102, for example, in at least one of the work cells 226 of the manufacturing environment 224 during a processing operation (e.g., a machining operation).

Figure 13:
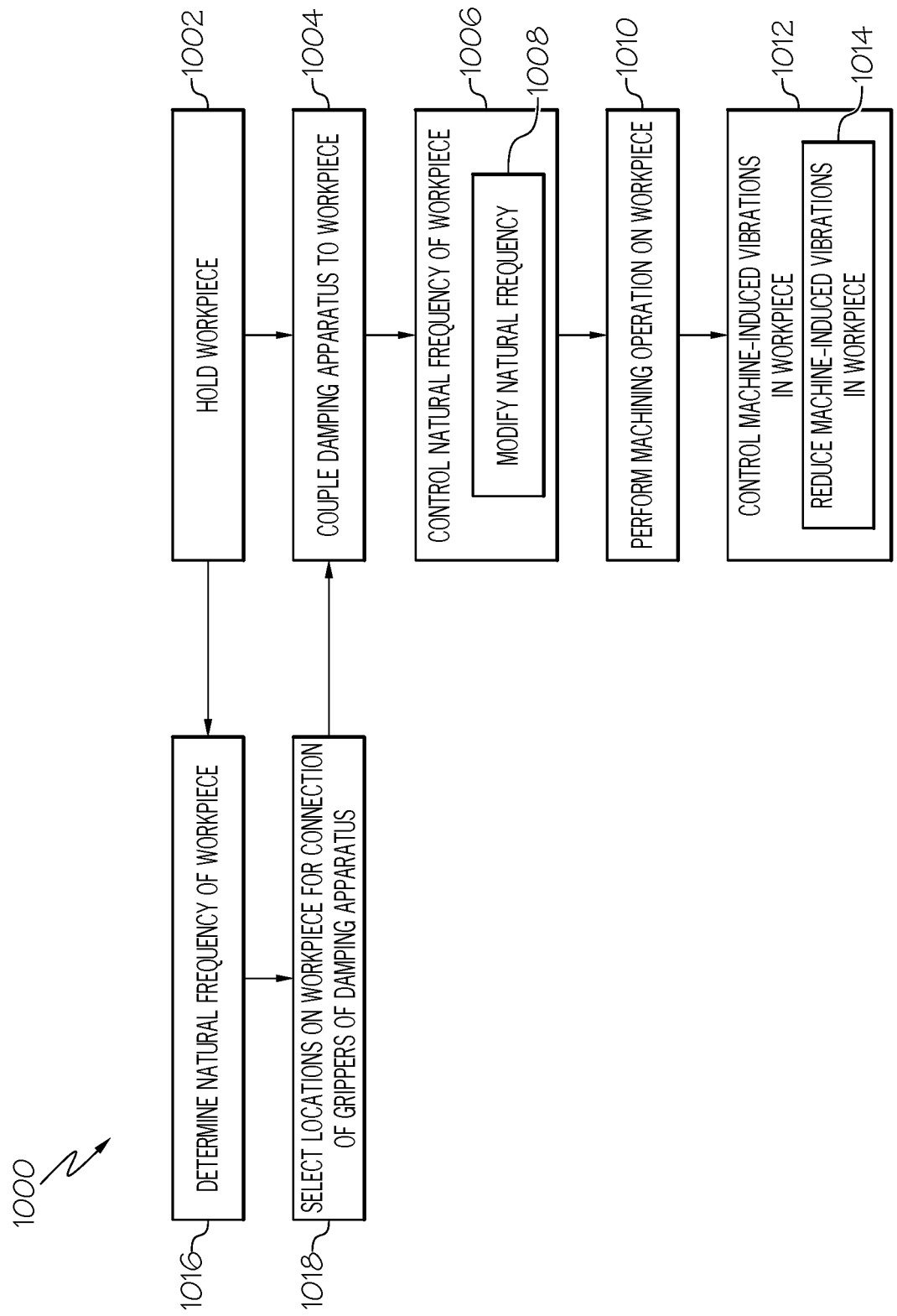
FIG. 13 is a flow diagram of an example of a method for damping vibrations in a workpiece.
Figure 17:
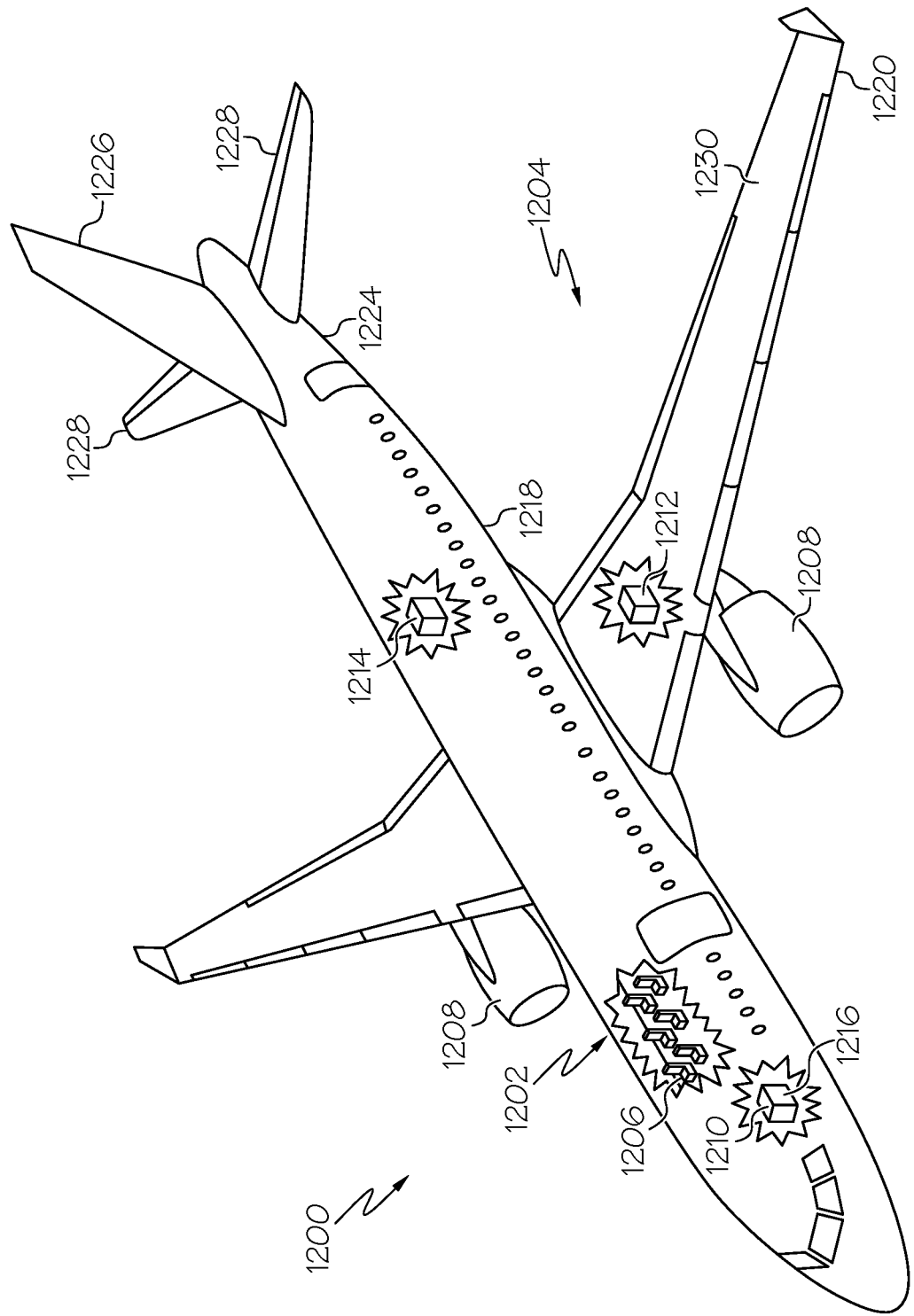
FIG. 17 is a schematic illustration of an example of an aircraft.

Referring generally to FIGS. 1-12 and particularly to FIG. 13, by way of examples, the present disclosure is also directed to a method 1000 for damping vibrations in the workpiece 102. In one or more examples, the method 1000 for damping vibrations in the workpiece 102 is implemented during, or forms a portion of, a method for processing or manufacturing the workpiece 102. In one or more examples, the method 1000 for damping vibrations in the workpiece 102 is implemented during, or forms a portion of, a method for fabricating a portion of an aircraft 1200 (e.g., as shown in FIG. 17). In one or more examples, the method 1000 is implemented using the system 100. In one or more examples, the method 1000 is implemented using the damping apparatus 174.

Generally, the method 1000 includes, or begins with, a step of forming the workpiece 102. In one or more examples, the workpiece 102 is made or formed of a composite material (e.g., is a composite workpiece). In one or more examples, the workpiece 102 is made or formed of a metallic material (e.g., is a metallic workpiece). At this point in the fabrication process, the workpiece 102 may also be considered or referred to as a pre-cursor workpiece in which the workpiece 102 is in a condition prior to machining or post-formation processing operations being performed on the workpiece 102.

In reference to a composite workpiece, the step of forming the workpiece 102 includes a step of forming a composite layup on a tool surface of the tool 150. Alternatively, the method 1000 includes a step of forming the composite layup on a dedicate layup tool and a step of transferring the composite layup to the tool 150 for curing. The method 1000 also includes a step of curing the composite layup (e.g., an uncured or "green" composite) on the tool 150 to form the workpiece 102 (e.g., a cured composite workpiece).

In one or more examples, the method 1000 includes a step of performing at least one (e.g., an initial) processing operation on the workpiece 102, for example, while the workpiece 102 (e.g., the composite workpiece) is on the tool 150, having the as-built shape. For example, the holes 248 may be machined (e.g., drilled) through the workpiece 102, while the workpiece 102 is on the tool 150 and has the as-built shape.

In one or more examples, the method 1000 includes a step of digitizing at least a portion of the workpiece 102 having the as-build shape. In one or more examples, the step of digitizing the workpiece 102 includes a step of generating the measurement data 132 (e.g., as-built measurement data) for the workpiece 102. In one or more examples, the measurement data 132 is generated using the metrology system 108. In one or more examples, the measurement data 132 is generated while the workpiece 102 is on the tool 150 and has the as-built shape. In one or more examples, the step of digitizing at least a portion of the workpiece 102 includes a step of generating the as-built model 116 using the measurement data 132.

In reference to a composite workpiece, in one or more examples, the method 1000 includes a step of demolding the workpiece 102 from the tool 150. In one or more examples, the step of demolding the workpiece 102 includes a step of separating the workpiece 102 from the tool surface and a step of removing the workpiece 102 from the tool 150. In one or more examples, the step of demolding is preformed automatically or semi-automatically using a material handler. In one or more examples, the step of demolding is performed manually.

In one or more examples, the method 1000 includes a step of transporting the workpiece 102. For example, the workpiece 102 is transported from one of the work cells 226 (e.g., the first work cell 228) to another one of the work cells 226 (e.g., the second work cell 230) of the manufacturing environment 224.

In one or more examples, the workpiece 102 is transported from one of the work cells 226 (e.g., the first work cell 228) to another one of the work cells 226 (e.g., the second work cell 230) using a material handler. In one or more examples, the workpiece 102 is transported from one of the work cells 226 (e.g., the second work cell 230) to another one of the work cells 226 (e.g., the third work cell 232) using the overhead workpiece handler 166.

In one or more examples, the method 1000 includes a step of (block 1002) holding the workpiece 102. In one or more examples, the workpiece 102 is held using the workpiece holders 106. For example, the workpiece 102 is held in one of the work cells 226 (e.g., the second work cell 230) using the workpiece holders 106. In one or more examples, according to the method 1000, the workpiece holders 106 hold the workpiece 102 in an upright or upstanding position such that the first surface 144 is oriented approximately vertical.

In one or more examples, the method 1000 includes a step of indexing the workpiece 102. In one or more examples, the workpiece 102 is indexed using the workpiece holders 106.

In one or more examples, the method 1000 includes a step of conforming the workpiece 102 to the desired shape of the workpiece 102. In one or more examples, the workpiece 102 is conformed to the desired shape using the workpiece holders 106.

In one or more examples, the method 1000 includes a step of digitizing at least a portion of the workpiece 102 with the workpiece 102 held in one of the work cells 226 (e.g., the second work cell 230), for example, in the indexed position and/or in the conformed shape as held by the workpiece holders 106. In one or more examples, the step of digitizing at least a portion of the workpiece 102 includes a step of generating the measurement data 132 (e.g., real-time measurement data) for the workpiece 102. In one or more examples, the measurement data 132 is generated using the metrology system 108. In one or more examples, the measurement data 132 is generated while the workpiece 102 is held by the workpiece holders 106 in the indexed position and has the desired shape. In one or more examples, the step of digitizing at least a portion of the workpiece 102 includes a step of generating the real-time model 112 using the measurement data 132.

In one or more examples, the method 1000 includes a step of comparing the real-time model 112 (e.g., real-time measurement data) to the as-built model 116 (e.g., as-built measurement data). In one or more examples, step of comparing the real-time model 112 to the as-built model 116 includes a step of determining a transform that fits the real-time model 112 to the as-built model 116.

In one or more examples, the method 1000 includes a step of confirming that the workpiece 102 is appropriately indexed based on the comparison of the real-time model 112 to the as-built model 116. In one or more examples, the method 1000 includes a step of confirming that the workpiece 102 is conformed to the as-built shape based on the comparison of the real-time model 112 to the as-built model 116.

In one or more examples, the method 1000 includes a step of (block 1004) coupling the damping apparatus 174 to the workpiece 102. In one or more examples, the damping apparatus 174 is coupled to the workpiece 102 between a directly adjacent pair of the workpiece holders 106. In one or more examples, according to the method 1000, the damping apparatus 174 is coupled to the first surface of the workpiece 102. The damping apparatus 174 selectively controls the natural frequency 250 of the workpiece 102, for example, prior to or during the machining operation performed using the machine tool 134.

In one or more examples, the method 1000 includes a step of (block 1006) selectively controlling the natural frequency 250 of the workpiece 102. In one or more examples, the natural frequency 250 of at least a portion (e.g., portion 254) of the workpiece 102 is performed using the damping apparatus 174.

In one or more examples, according to the method 1000, the step of (block 1006) controlling the natural frequency 250 of the workpiece 102 includes a step of (block 1008) modifying the natural frequency 250 of the workpiece 102, such as of at least a portion (e.g., portion 254) of the workpiece 102, for example, that extends between the directly adjacent pair of the workpiece holders 106. For example, the natural frequency 250 of at least a portion (e.g., portion 254) of the workpiece 102 is modified by the damping apparatus 174 such that the modified natural frequency 252 of the workpiece 102 is less than a frequency of the machine-induced vibrations.

In one or more examples, the method 1000 includes a step of (block 1010) performing a machining operation on the workpiece 102. Generally, damping apparatus 174 is coupled to the workpiece 102 (e.g., block 1004) and the natural frequency 250 of the workpiece 102 is selectively controlled or modified (e.g., block 1006) before the machining operation is performed on the workpiece 102 (e.g., block 1010). In one or more examples, the machining operation is performed while the workpiece 102 is held by the workpiece holders 106 and the damping apparatus 174 is coupled to the workpiece 102. In one or more examples, the machining operation is automatically performed using the machine tool 134, for example, under direction from the computing device 110.

In one or more examples, the method 1000 includes a step of (block 1012) selectively controlling machine-induced vibrations in the workpiece 102 during the machining operation (e.g., vibrations induced by the machining operation). In one or more examples, the machine-induced vibrations are selectively controlled by controlling or modifying the natural frequency 250 of the workpiece 102 using the damping apparatus 174. In one or more examples, step of (block 1012) selectively controlling the machine-induced vibrations includes a step of (block 1014) reducing the machine-induced vibrations in the workpiece 102 during the machining operation.

In one or more examples, according to the method 1000, the step of (block 1006) selectively controlling the natural frequency 250 of the workpiece 102 includes a step of increasing the mass 103 of at least the portion 254 of the workpiece 102.

In one or more examples, according to the method 1000, the step of (block 1006) selectively controlling the natural frequency 250 of the workpiece 102 includes a step of increasing the stiffness 105 of at least the portion 254 of the workpiece 102.

In one or more examples, according to the method 1000, the natural frequency 250 of at least the portion 254 of the workpiece 102 is modified such that the modified natural frequency 252 of at least the portion 254 of the workpiece 102 is different than the frequency 260 of the oscillating force 256 applied to the workpiece 102 by the machine tool 134 during the machining operation.

Generally, a portion (e.g., portion 254) of the workpiece 102 for which the natural frequency 250 is being selectively controlled is a portion of the workpiece 102 upon which the machining operation is being performed. As illustrated in FIGS. 4 and 5, in one or more examples, the natural frequency 250 of the workpiece 102 is selectively controlled at more than one portion by coupling the plurality of damping apparatuses 104 to more than one portion 254 of the workpiece 102.

In one or more examples, the natural frequency 250 of at least the portion 254 of the workpiece 102 maintained within a desired range during the machining operation. The desired range of the natural frequency 250 (e.g., the modified natural frequency 252) as selectively controlled by the damping apparatus 174 may depend on various factors, such as, but not limited to, the configuration (e.g., geometry, size, shape, material composition, etc.) of the workpiece 102, the type of machining operation performed on the workpiece 102, the type of machine tool 134 performing the machining operation, and the like. For example, in certain situations, for example, depending on the workpiece 102 and the machining operation being performed, some level of machine-induced vibration may be tolerable or desirable and in other situations little to no machine-induced vibration may be tolerable or desirable. As such, the desired range for the natural frequency 250 is selected and controlled by the damping apparatus 174.

In one or more examples, according to the method 1000, the natural frequency 250 of the portion 254 of the workpiece 102 is modified such that the modified natural frequency 252 of the portion 254 of the workpiece 102 is less than the frequency 260 of the oscillating force 256 applied to the workpiece 102 by the machine tool 134 during the machining operation.

In one or more examples, according to the method 1000, the natural frequency 250 of the portion 254 of the workpiece 102 is modified such that the modified natural frequency 252 of the portion 254 of the workpiece 102 is less than approximately one-half of the frequency 260 of the oscillating force 256 applied to the workpiece 102 by the machine tool 134 during the machining operation.

In one or more examples, according to the method 1000, the natural frequency 250 of the portion 254 of the workpiece 102 is modified such that the modified natural frequency 252 of the portion 254 of the workpiece 102 is less than approximately one-third of the frequency 260 of the oscillating force 256 applied to the workpiece 102 by the machine tool 134 during the machining operation.

In one or more examples, according to the method 1000, the step of (block 1006) selectively controlling the natural frequency 250 of the workpiece 102 includes a step of selectively connecting one or more of the plurality of grippers 200 of the damping apparatus 174 to the workpiece 102 at one or more locations 222. In one or more examples, the damping apparatus 174 includes the fixture base 198 and the plurality of grippers 200, which is coupled to the fixture base 198. Each one of the grippers 200 is selectively movable (e.g., extendable and retractable) relative to the fixture base 198 to be selectively connected to the workpiece 102. The natural frequency 250 of the portion 254 of the workpiece 102 is modified by selecting one or more locations 222 on the portion of the workpiece 102 and selectively connecting one or more of the grippers 200 to the workpiece 102 at the one or more locations 222. The select grippers 200 connected to the workpiece 102 at the locations 222 increase the mass 103 of at least a portion of the workpiece 102 and/or increase the stiffness 105 of at least a portion of the workpiece 102.

In one or more examples, the method 1000 includes a step of (block 1016) determining the natural frequency 250 of the workpiece 102 or at least a portion (e.g., portion 254) of the workpiece 102. The natural frequency 250 of the workpiece 102 can be determined by any one of various suitable techniques. In one or more examples, the natural frequency 250 is determined by analyzing the real-time model 112 of the workpiece 102, for example, as held by the workpiece holders 106, and calculating the natural frequency 250. Alternatively, the natural frequency 250 can be measured.

Additionally, in one or more examples, the method 1000 includes a step of determining (e.g., detecting or measuring) a frequency of the machine-induced vibrations and/or the frequency 260 of the oscillating force 256 applied to the workpiece 102 by the machine tool 134 during the machining operation.

In one or more examples, the method 1000 includes a step of (block 1018) selecting the one or more locations 222 on the workpiece 102 for connection of the one or more of the plurality of grippers 200. The one or more locations 222 are selected such that the modified natural frequency 252 of at least a portion (e.g., portion 254) of the workpiece 102 is less than the frequency 260 of the oscillating force 256 applied to the workpiece 102 by the machine tool 134 during the machining operation. In other words, the natural frequency 250 of at least a portion (e.g., portion 254) of the workpiece 102 is selectively controlled or modified by the select grippers 200 such that the modified natural frequency 252 of the workpiece 102 is less than a frequency of the machine-induced vibrations.

In one or more examples, the step of (block 1004) coupling the damping apparatus 174 to the workpiece 102 includes a step of extending the linear actuator 202 of at least one of a plurality of grippers 200 of the damping apparatus 174. The step of (block 1004) coupling the damping apparatus 174 to the workpiece 102 also includes a step of placing the vacuum cup 204, coupled to the linear actuator 202, in contact with the workpiece 102. The step of (block 1004) coupling the damping apparatus 174 to the workpiece 102 further includes a step of applying vacuum between the vacuum cup 204 and the workpiece 102.

In one or more examples, the step of (block 1004) coupling the damping apparatus 174 to the workpiece 102 also includes a step of engaging the power-transmitting component 212 of at least the one of the plurality of grippers 200 to extend the linear actuator 202 from the first position 268 to the second position 270 that places the vacuum cup 204 in contact with the workpiece 102. Upon contact of vacuum cup 204 with the workpiece 102, the step of (block 1004) coupling the damping apparatus 174 to the workpiece 102 also includes a step of disengaging the power-transmitting component 212 to enable free extension of the linear actuator 202. With the vacuum cup 204 in contact with the workpiece 102 and the power-transmitting component 212 disengaged, the step of (block 1004) coupling the damping apparatus 174 to the workpiece 102 further includes a step of further extending the linear actuator 202 to a third position 272 in response to the step of applying the vacuum between the vacuum cup 204 and the workpiece 102. With the vacuum formed between the vacuum cup 204 and the workpiece 102 and the power-transmitting component 212 disengaged, the step of (block 1004) coupling the damping apparatus 174 to the workpiece 102 additionally includes a step of engaging the actuator stop-lock 210 of at least the one of the plurality of grippers 200 to lock the linear actuator 202 in the third position 272.

In one or more examples, according to the method 1000, each one of the grippers 200 includes the linear actuator 202, the vacuum cup 204 that is coupled to the linear actuator 202, and the actuator control unit 208 that controls extension and retraction of the linear actuator 202. In one or more examples, according to the method 1000, each one of the grippers 200 includes the power-transmitting component 212 that drives extension and retraction of the linear actuator 202 and the actuator stop-lock 210 that selectively locks a position of the linear actuator 202.

In one or more examples, the method 1000 includes a step of detecting contact of the vacuum cup 204 with the workpiece 102. In one or more examples, the step of detecting contact is performed using the sensor 206.

In one or more examples, according to the method 1000, the fixture base 198 includes the pedestal 216 and the stanchion 218 that is coupled to the pedestal 216. The grippers 200 are coupled to the stanchion 218. In one or more examples, the step of (block 1004) coupling the damping apparatus 174 to the workpiece 102 includes a step of moving the pedestal 216 relative to the workpiece 102. In one or more examples, the step of (block 1004) coupling the damping apparatus 174 to the workpiece 102 includes a step of moving the stanchion 218 relative to the pedestal 216. In one or more examples, the step of (block 1004) coupling the damping apparatus 174 to the workpiece 102 includes a step of extending one or more of the grippers 200 from the stanchion 218.

In one or more examples, the method 1000 includes a step of digitizing at least a portion of the workpiece 102 after the machining operation (e.g., block 1006). In one or more examples, the step of digitizing at least a portion of the workpiece 102 includes a step of generating the measurement data 132 (e.g., as-machined measurement data) for the workpiece 102. In one or more examples, the measurement data 132 is generated using the metrology system 108. In one or more examples, the measurement data 132 is generated while the workpiece 102 is held by the workpiece holders 106 and has the desired shape. In one or more examples, the step of digitizing at least a portion of the workpiece 102 includes a step of generating the as-machined model 180 using the measurement data 132.

In one or more examples, at least a portion of the steps described above are repeated a number of times as the workpiece 102 moves through the work cells 226 and a number of post-processing operations are performed on the workpiece 102.

The present disclosure is also directed to a system (e.g., the system 100) for damping vibrations in the workpiece 102 implemented according to the method 1000. The present disclosure is further directed to the workpiece 102 manufacturing according to the method 1000. The present disclosure is further directed to a portion of the aircraft 1200 assembled according to the method 1000.

Figure 14:
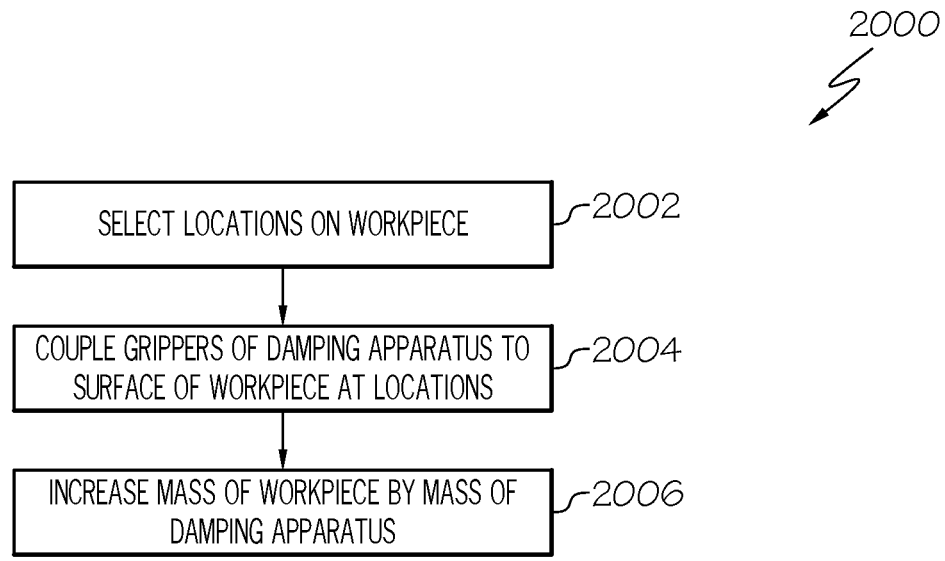
FIG. 14 is a flow diagram of an example of a method for increasing a mass of a workpiece.

Referring generally to FIGS. 1-12 and particularly to FIG. 14, by way of examples, the present disclosure is also directed to a method 2000 for selectively increasing the mass 103 of the workpiece 102. In one or more examples, the method 2000 is implemented during, or forms a portion of, a method for processing or manufacturing the workpiece 102. In one or more examples, the method 2000 is implemented during, or forms a portion of, a method for fabricating a portion of an aircraft 1200 (e.g., as shown in FIG. 17). In one or more examples, the method 2000 is implemented using the system 100. In one or more examples, the method 2000 is implemented using the damping apparatus 174.

In one or more examples, the method 2000 includes a step of (block 2002) selecting one or more locations 222 on the workpiece 102. In one or more examples, the method 2000 also includes a step of (block 2004) coupling the damping apparatus 174 the workpiece 102 at the one or more locations 222. In one or more examples, the method 2000 further includes a step of (block 2006) increasing the mass 103 of at least a portion (e.g., portion 254) of the workpiece 102, including the one or more locations 222, by the mass 107 of the damping apparatus 174.

In one or more examples, the step of (block 2004) coupling the damping apparatus 174 to the workpiece 102 includes a step of coupling one or more of the plurality of grippers 200 of the damping apparatus 174 to a surface (e.g., first surface 144) of the workpiece 102 at the one or more locations 222.

In one or more examples, the method 2000 is an example of the step of (block 1006) selectively controlling the natural frequency 250 of the workpiece 102 of the method 1000 (e.g., as shown in FIG. 13). Accordingly, while not explicitly illustrated in FIG. 14, the method 2000 may also include one or more of the operational steps described herein above and/or illustrated in FIG. 13 in reference to the method 1000.

In one or more examples, according to the method 2000, the workpiece 102 is made of a composite material. In one or more examples, according to the method 2000, the workpiece 102 is made of a metallic material.

Referring generally to FIGS. 1-12 and particularly to FIG. 15, by way of examples, the present disclosure is also directed to a method 3000 for selectively modifying the natural frequency 250 of the workpiece 102. In one or more examples, the method 3000 is implemented during, or forms a portion of, a method for processing or manufacturing the workpiece 102. In one or more examples, the method 3000 is implemented during, or forms a portion of, a method for fabricating a portion of an aircraft 1200 (e.g., as shown in FIG. 17). In one or more examples, the method 3000 is implemented using the system 100. In one or more examples, the method 3000 is implemented using the damping apparatus 174.

In one or more examples, the method 3000 includes a step of (block 3002) determining the natural frequency 250 of the workpiece 102. In one or more examples, the method 3000 includes a step of (block 3004) modifying the natural frequency 250 of at least a portion (e.g., portion 254) of the workpiece 102 by at least one of a step of (block 3006) increasing a mass 103 of at least the portion 254 of the workpiece 102 and/or a step of (block 3008) increasing a stiffness 105 of at least a portion 254 of the workpiece 102 when the oscillating force 256 is applied to the workpiece 102 by the machine tool 134 during the machining operation.

In one or more examples, the natural frequency 250 is modified, for example, the mass 103 and/or the stiffness 105 of the workpiece 102 is increased, such that the modified natural frequency 252 of at least the portion 254 of the workpiece 102 is less than the frequency 260 of the oscillating force 256 applied to the workpiece 102 by the machine tool 134 during the machining operation.

In one or more examples, the method 3000 is an example of the step of (block 1008) modifying the natural frequency 250 of the workpiece 102 and the step of (block 1016)

determining the natural frequency 250 of the workpiece 102 of the method 1000 (e.g., as shown in FIG. 13). Accordingly, while not explicitly illustrated in FIG. 15, the method 3000 may also include one or more of the operational steps described herein above and/or illustrated in FIG. 13 in reference to the method 1000.

In one or more examples, according to the method 3000, the workpiece 102 is made of a composite material. In one or more examples, according to the method 3000, the workpiece 102 is made of a metallic material.

Figure 16:
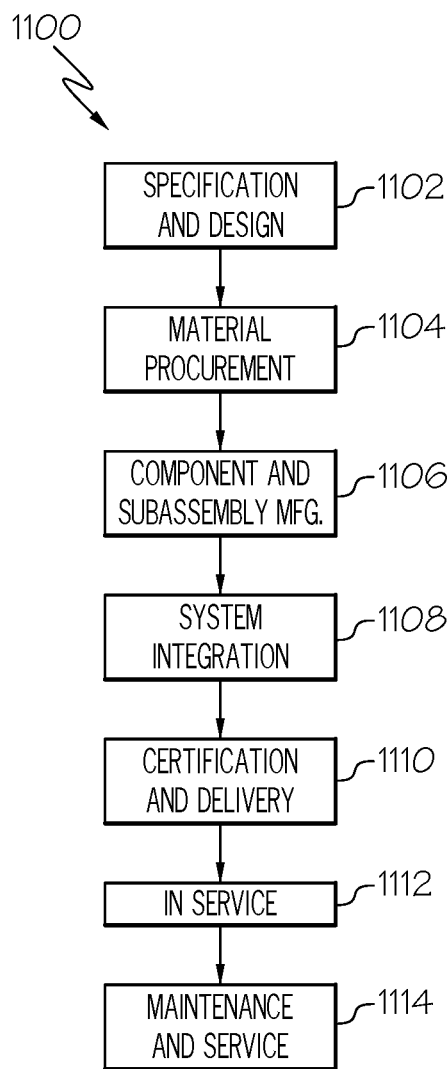
FIG. 16 is a flow diagram of an example of an aircraft manufacturing and service method.

Referring now to FIGS. 16 and 17, examples of the system 100, the method 1000, and the workpiece 102 may be related to, or used in the context of, an aircraft manufacturing and service method 1100, as shown in the flow diagram of FIG. 16 and the aircraft 1200, as schematically illustrated in FIG. 17. For example, the aircraft 1200 and/or the aircraft production and service method 1100 may utilize the workpiece 102 that is held and machined while damping machine-induced vibration using the system 100, described herein and illustrated in FIGS. 1-12, and/or according to the method 1000, described herein and illustrated in FIG. 13, the method 2000, described herein and illustrated in FIG. 14 and/or the method 3000, described herein and illustrated in FIG. 15.

Referring to FIG. 17, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, an environmental system 1214 and a flight control system 1216. In other examples, the aircraft 1200 may include any number of other types of systems, such as a communications system, a flight control system, a guidance system, a weapons system, and the like. In one or more examples, the workpiece 102 made (e.g., held, machined and/or processed) using the system 100 and/or according to the method 1000 forms a component of the airframe 1202, such as a wing 1220, a fuselage 1218, a tail 1224, a vertical stabilizer 1226, a horizontal stabilizer 1228 or a panel, a stringer, a spar, or another component thereof.

Referring to FIG. 16, during pre-production, the service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the service method 1100 illustrated in FIG. 16 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the damping apparatus 174 and the methods 1000, 2000, 3000 shown and described herein may be employed during any one or more of the stages of the manufacturing and service method 1100 shown in the flow diagram illustrated by FIG. 16. In an example, manufacture of the workpiece 102 in accordance with the methods 1000, 2000, 3000 and/or using the system 100 or the damping apparatus 174 may form a portion of component and subassembly manufacturing (block 1106) and/or system integration (block 1108). Further, the workpiece 102 manufactured in accordance with the methods 1000, 2000, 3000 and/or using the system 100 or the damping apparatus 174 may be utilized in a manner similar to components or subassemblies prepared while the aircraft 1200 is in service (block 1112). Also, the workpiece 102 manufactured in accordance with the methods 1000, 2000, 3000 and/or using the system 100 or the damping apparatus 174 may be utilized during system integration (block 1108) and certification and delivery (block 1110). Similarly, manufacture of the workpiece 102 in accordance with the methods 1000, 2000, 3000 and/or using the system 100 or the damping apparatus 174 may be utilized, for example and without limitation, while the aircraft 1200 is in service (block 1112) and during maintenance and service (block 1114). For example, spare and or replacement composite parts may be fabricated in accordance with the methods 1000, 2000, 3000 and/or using the system 100 or the damping apparatus 174, which may be installed due to a prescribed maintenance cycle or after a realization of damage to a composite part.

In can be appreciated that performing at least a portion of the processing operation on the workpiece 102 while the workpiece 102 is held, indexed and/or conformed to the desired shape by the workpiece holders 106 and while machine-induced vibration is dampened using the damping apparatus 174 in one or more of the work cells 226, may improve the accuracy and speed of the processing operation. Furthermore, updating the model of the workpiece 102 (e.g., the as-machined model 180) after each subsequent processing operation may enable determinant assembly or predictive assembly using the workpiece 102.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite structures, systems, and methods of making the same for other types of vehicles (e.g., land vehicles, marine vehicles, space vehicles, etc.) and stand-alone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

For the purpose of the present disclosure, the term "position" of an item refers to a location of the item in three-dimensional space relative to a fixed reference frame and an angular orientation of the item in three-dimensional space relative to the fixed reference frame.

As used herein, relative positional (e.g., locational and/or orientational) terms, such as parallel, perpendicular, horizontal, vertical, and similar terms include approximations of such positional terms (e.g., approximately parallel, approximately perpendicular, approximately, vertical, approximately horizontal, etc.).

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

Conditional language such as, among others, "can" or "may," unless specifically stated otherwise, are understood within the context as used to generally convey that a certain example includes, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any example.

FIGS. 1-12 and 17, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-12 and 17, referred to above, need be included in every example and not all elements, features, and/or components described herein are necessarily depicted in each illustrative example. Accordingly, some of the elements, features, and/or components described and illustrated in FIGS. 1-12 and 17 may be combined in various ways without the need to include other features described and illustrated in FIGS. 1-12 and 17, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-12 and 17, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-12 and 17, and such elements, features, and/or components may not be discussed in detail herein with reference to each of FIGS. 1-12 and 17. Similarly, all elements, features, and/or components may not be labeled in each of FIGS. 1-12 and 17, but reference numerals associated therewith may be utilized herein for consistency.

In FIGS. 13-15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 13-15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the damping apparatus 174, the methods 1000, 2000, 3000 and the workpiece 102 have been shown and described, modifications may occur to those skilled in the art upon reading the specification. The present application includes such modifications and is limited only by the scope of the claims.

What is claimed is:

1. A system for damping vibrations in a workpiece, wherein the system comprises:
    a work cell;
    a plurality of workpiece holders to hold the workpiece in the work cell;
    a machine tool located in the work cell, wherein the machine tool performs a machining operation on the workpiece while the workpiece is held by the plurality of workpiece holders;
    a damping apparatus comprising:
        a fixture base; and
        a plurality of grippers coupled to the fixture base and selectively extendable and retractable relative to the fixture base to be selectively coupled to the workpiece, wherein the damping apparatus controls machine-induced vibrations in the workpiece during the machining operation by selectively engaging one or more locations on the workpiece with one or more of the plurality of grippers to modify a natural frequency of at least a portion of the workpiece such that the natural frequency of the at least a portion of the workpiece is different than a frequency of an oscillating force applied to the workpiece by the machine tool during the machining operation; and
    a computing device that is operable to:
        determine the natural frequency of the at least a portion of the workpiece by analyzing a real-time model of the workpiece, wherein the real-time model represents the workpiece as held by the plurality of workpiece holders; and
        select the one or more locations on the workpiece for connection of the one or more of the plurality of grippers such that a modified natural frequency of the at least a portion of the workpiece is different than the frequency of the oscillating force applied to the workpiece by the machine tool during the machining operation.

2. The system of claim 1, wherein the one or more of the plurality of grippers of the damping apparatus are coupled to a first surface of the workpiece between a directly adjacent pair of the plurality of workpiece holders.

3. The system of claim 1, wherein the natural frequency of the at least a portion of the workpiece is modified such that the natural frequency of the at least a portion of the workpiece is less than the frequency of the oscillating force applied to the workpiece by the machine tool during the machining operation.

4. The system of claim 1,
    wherein the one or more locations on the portion of the workpiece for connection of the one or more of the plurality of grippers are selected such that the modified natural frequency of the at least a portion of the workpiece is less than the frequency of the oscillating force applied to the workpiece by the machine tool during the machining operation.

5. The system of claim 1, wherein each one of the plurality of grippers comprises:
    a linear actuator;
    a vacuum cup coupled to the linear actuator, wherein the vacuum cup grips the workpiece using vacuum; and
    an actuator control unit that controls extension and retraction of the linear actuator to place the vacuum cup in contact with the workpiece and that controls application of the vacuum.

6. The system of claim 5, wherein:
    each one of the plurality of grippers further comprises:
        a power-transmitting component that drives extension and retraction of the linear actuator; and
        an actuator stop-lock that selectively locks a position of the linear actuator;
    the actuator control unit engages the power-transmitting component to extend the linear actuator from a first position to a second position that places the vacuum cup in contact with the workpiece;
    upon contact of the vacuum cup with the workpiece, the actuator control unit disengages the power-transmitting component to enable free extension of the linear actuator;
    with the vacuum cup in contact with the workpiece and the power-transmitting component disengaged, the actuator control unit applies the vacuum to further extend the linear actuator to a third position; and
    with the vacuum formed between the vacuum cup and the workpiece and the power-transmitting component disengaged, the actuator control unit engages the actuator stop-lock to lock the linear actuator in the third position.

7. The system of claim 5, wherein each one of the plurality of grippers further comprises a respective sensor that detects the contact of the corresponding vacuum cup with the workpiece.

8. The system of claim 1, wherein the natural frequency of the at least a portion of the workpiece is modified by selectively coupling the one or more of the plurality of grippers to the workpiece at the one or more locations to increase at least one of a stiffness and a mass of the at least a portion of the workpiece.

9. The system of claim 1, wherein the natural frequency of the at least a portion of the workpiece is modified such that the modified natural frequency of the at least a portion of the workpiece is less than approximately one-half of the frequency of the oscillating force applied to the workpiece by the machine tool during the machining operation.

10. The system of claim 2, wherein the natural frequency of the at least a portion of the workpiece is modified such that the natural frequency of the at least a portion of the workpiece is less than the frequency of the oscillating force applied to the workpiece by the machine tool during the machining operation.

11. The system of claim 2, wherein the one or more locations on the portion of the workpiece for connection of the one or more of the plurality of grippers are selected such that the modified natural frequency of the at least a portion of the workpiece is less than the frequency of the oscillating force applied to the workpiece by the machine tool during the machining operation.

12. The system of claim 2, wherein the natural frequency of the at least a portion of the workpiece is modified such that the modified natural frequency of the at least a portion of the workpiece is less than approximately one-half of the frequency of the oscillating force applied to the workpiece by the machine tool during the machining operation.

13. The system of claim 5, wherein the natural frequency of the at least a portion of the workpiece is modified such that the natural frequency of the at least a portion of the workpiece is less than the frequency of the oscillating force applied to the workpiece by the machine tool during the machining operation.

14. The system of claim 5, wherein the one or more locations on the portion of the workpiece for connection of the one or more of the plurality of grippers are selected such that the modified natural frequency of the at least a portion of the workpiece is less than the frequency of the oscillating force applied to the workpiece by the machine tool during the machining operation.

15. A method for damping vibrations in a workpiece with the system for damping vibrations of claim 1, wherein the method comprises steps of:
    providing the system for damping vibrations of claim 1;
    holding the workpiece with the plurality of workpiece holders of the system for damping vibrations;
    determining a natural frequency of at least a portion of the workpiece by analyzing a real-time model of the workpiece, wherein the real-time model represents the workpiece as held by the plurality of workpiece holders;
    selecting one or more locations on the workpiece for connection of one or more of the plurality of grippers of the damping apparatus of the system for damping vibrations such that a modified natural frequency of the at least a portion of the workpiece is different than a frequency of an oscillating force applied to the workpiece by the machine tool of the system for damping vibrations during a machining operation;
    selectively controlling the natural frequency of the at least a portion of the workpiece by selectively connecting the one or more of the plurality of grippers of the damping apparatus to the one or more locations on the workpiece such that a modified natural frequency of the at least a portion of the workpiece is different than the frequency of the oscillating force applied to the workpiece by the machine tool during the machining operation;
    performing the machining operation on the workpiece; and
    reducing machine-induced vibrations in the workpiece during the machining operation resulting from selective control of the natural frequency of the at least a portion of the workpiece.

16. The method of claim 15, wherein the one or more of the plurality of grippers of the damping apparatus are coupled to a first surface of the workpiece between a directly adjacent pair of the plurality of workpiece holders.

17. The method of claim 15, wherein the step of selectively connecting the one or more of the plurality of grippers of the damping apparatus to the workpiece comprises:
    extending a linear actuator of at least one of the plurality of grippers of the damping apparatus;
    placing a vacuum cup of at least one of the plurality of grippers, coupled to the linear actuator, in contact with the workpiece; and
    applying vacuum between the vacuum cup and the workpiece.

18. The method of claim 17, further comprising detecting contact of the vacuum cup with the workpiece.

19. The method of claim 15, wherein the natural frequency of the at least a portion of the workpiece is modified such that the modified natural frequency of the at least a portion of the workpiece is less than approximately one-half of the frequency of the oscillating force applied to the workpiece by the machine tool during the machining operation.

20. The method of claim 15, wherein the natural frequency of the at least a portion of the workpiece is modified such that the natural frequency of the at least a portion of the workpiece is less than the frequency of the oscillating force applied to the workpiece by the machine tool during the machining operation.

* * * * *